Oct. 20, 1953　　　　G. E. MARKLEY　　　2,656,171
FURNACE FOR HEATING CRUCIBLES AND THE LIKE
Filed May 13, 1947　　　　　　　　　　16 Sheets-Sheet 2

INVENTOR.
GEORGE E. MARKLEY
BY
ATTORNEY.

Oct. 20, 1953  G. E. MARKLEY  2,656,171
FURNACE FOR HEATING CRUCIBLES AND THE LIKE
Filed May 13, 1947  16 Sheets-Sheet 3

INVENTOR.
GEORGE E. MARKLEY
BY
*Harry P. Canfield*
ATTORNEY.

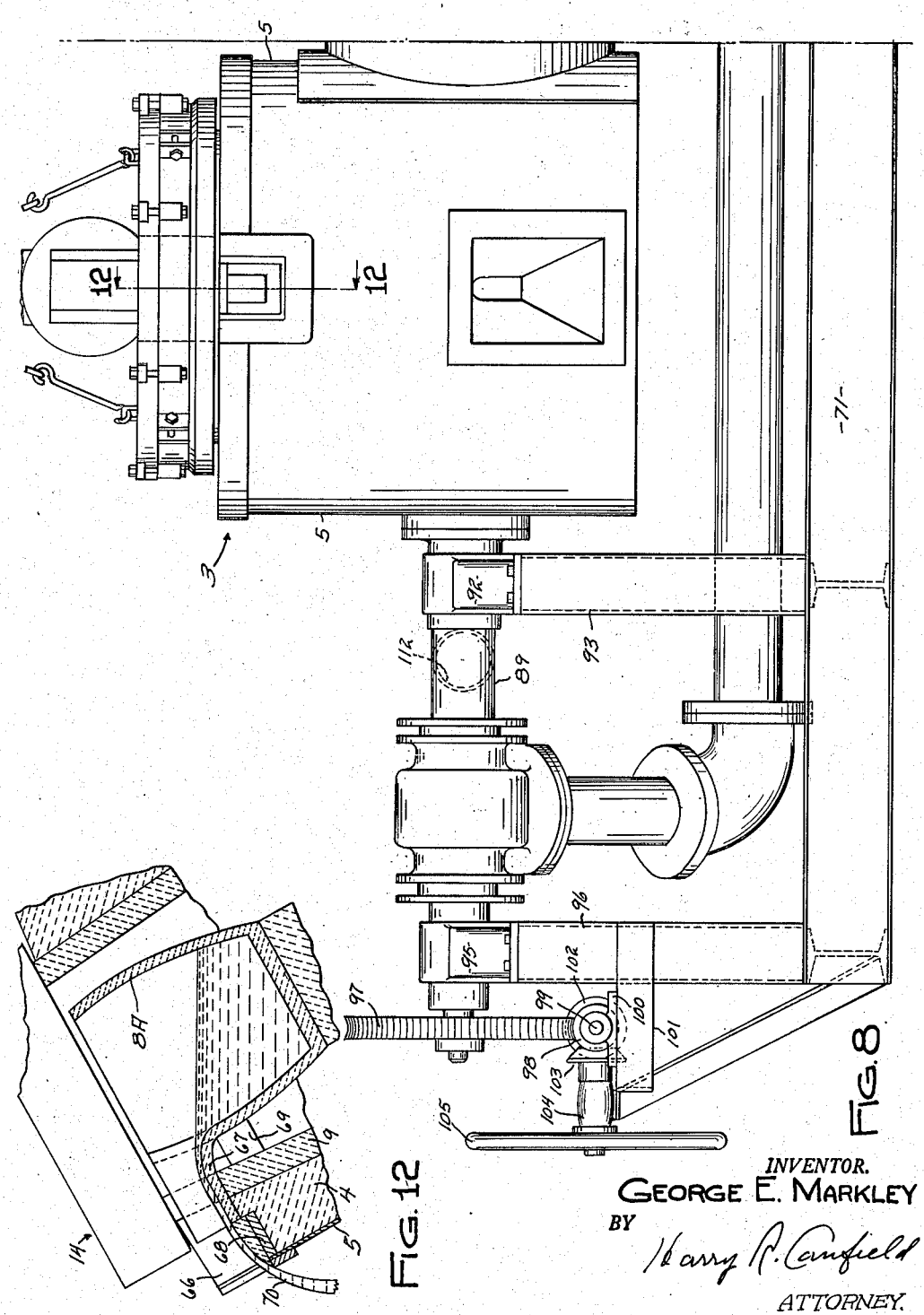

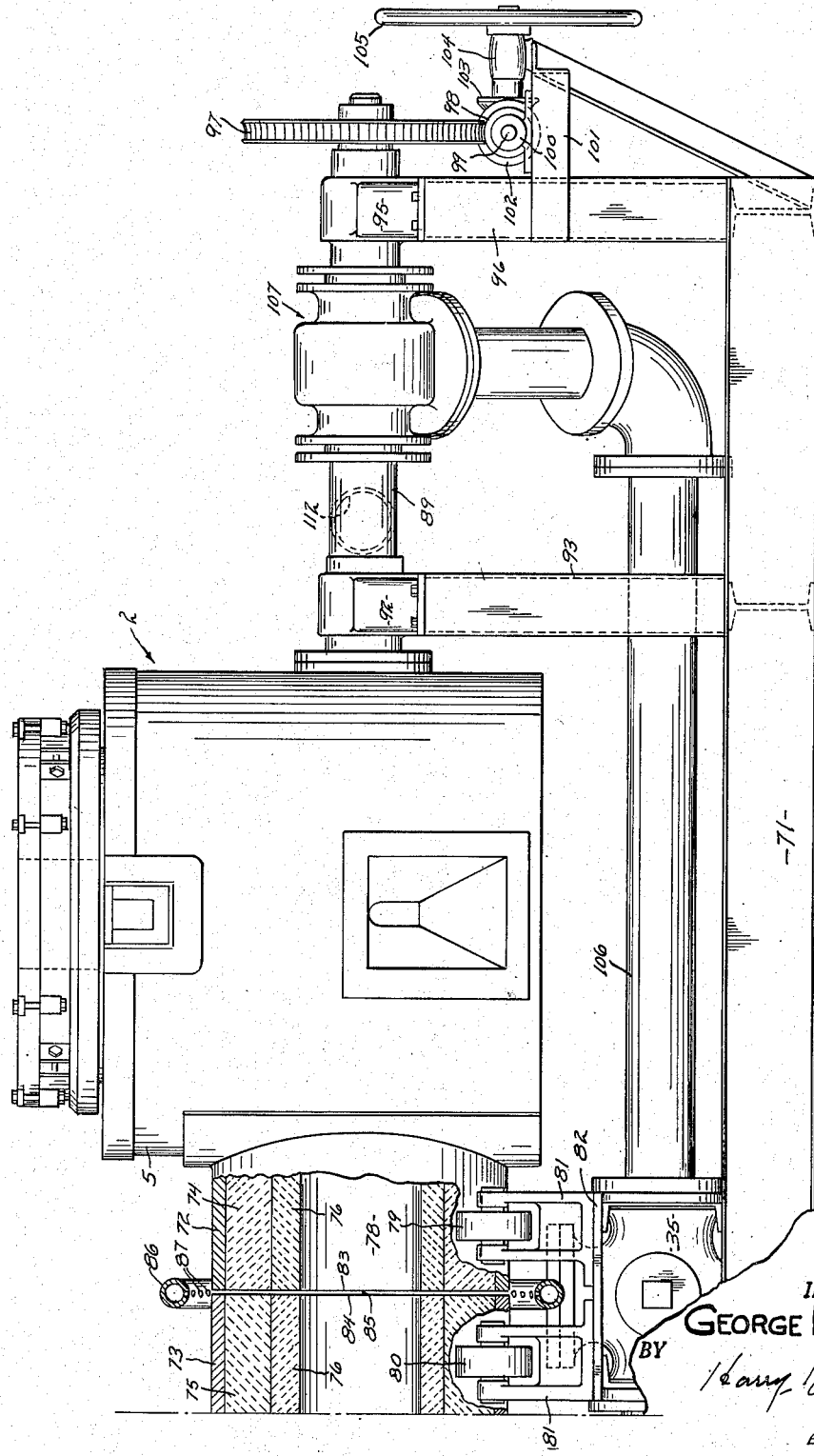

Oct. 20, 1953   G. E. MARKLEY   2,656,171
FURNACE FOR HEATING CRUCIBLES AND THE LIKE
Filed May 13, 1947   16 Sheets-Sheet 8

INVENTOR.
GEORGE E. MARKLEY
BY
*Harry P Canfield*
ATTORNEY

Oct. 20, 1953  G. E. MARKLEY  2,656,171
FURNACE FOR HEATING CRUCIBLES AND THE LIKE
Filed May 13, 1947  16 Sheets-Sheet 9

INVENTOR.
GEORGE E. MARKLEY
BY
Harry P. Canfield
ATTORNEY

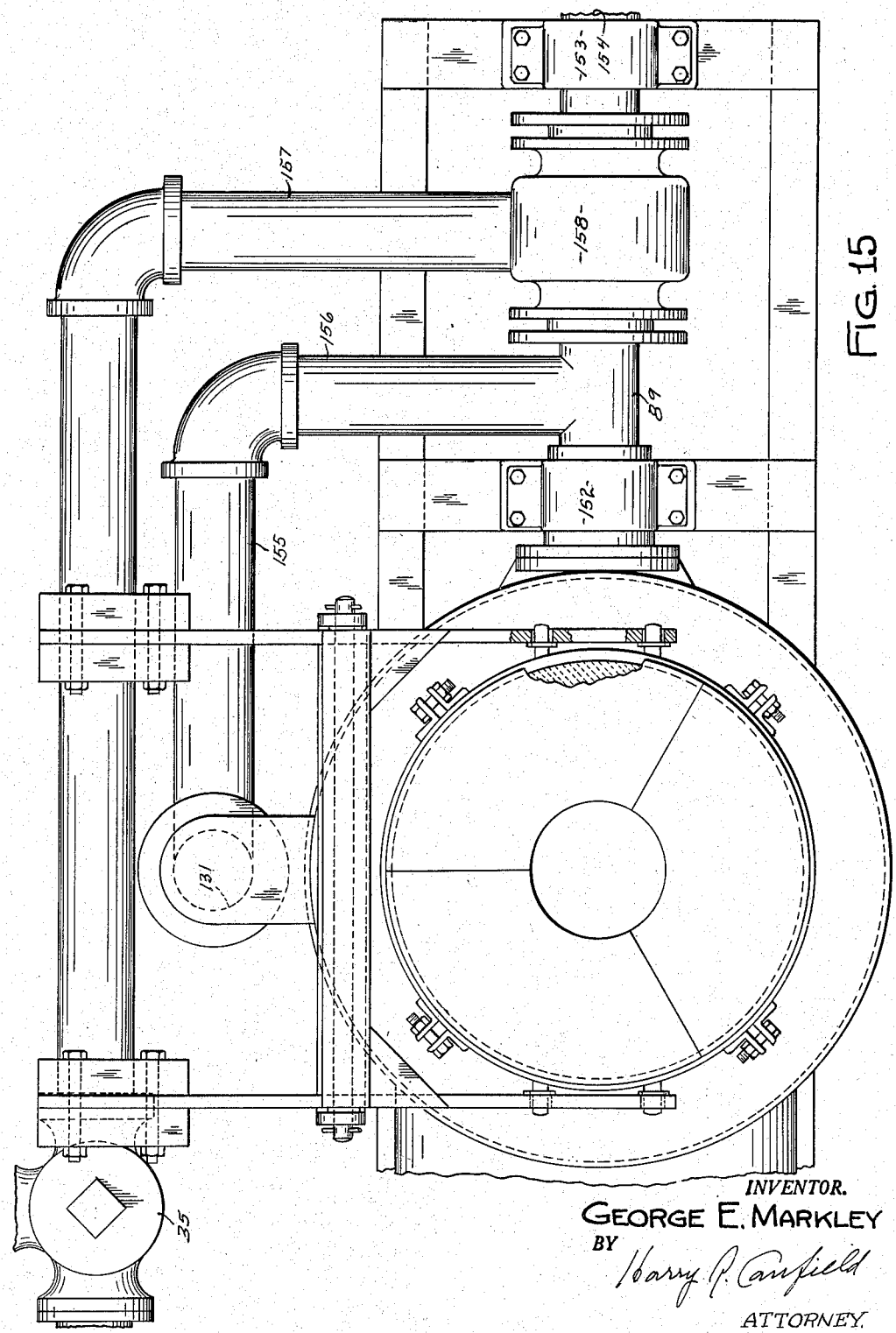

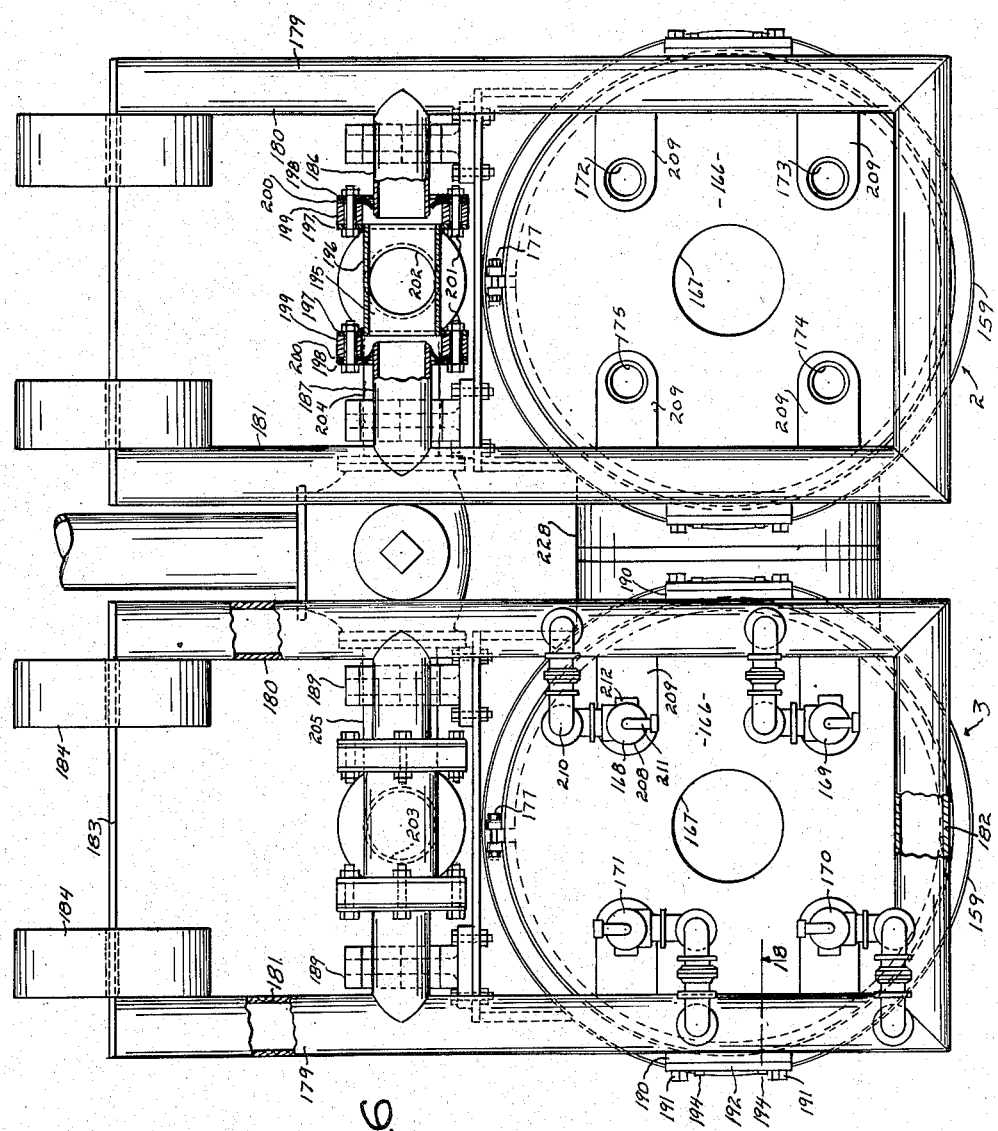

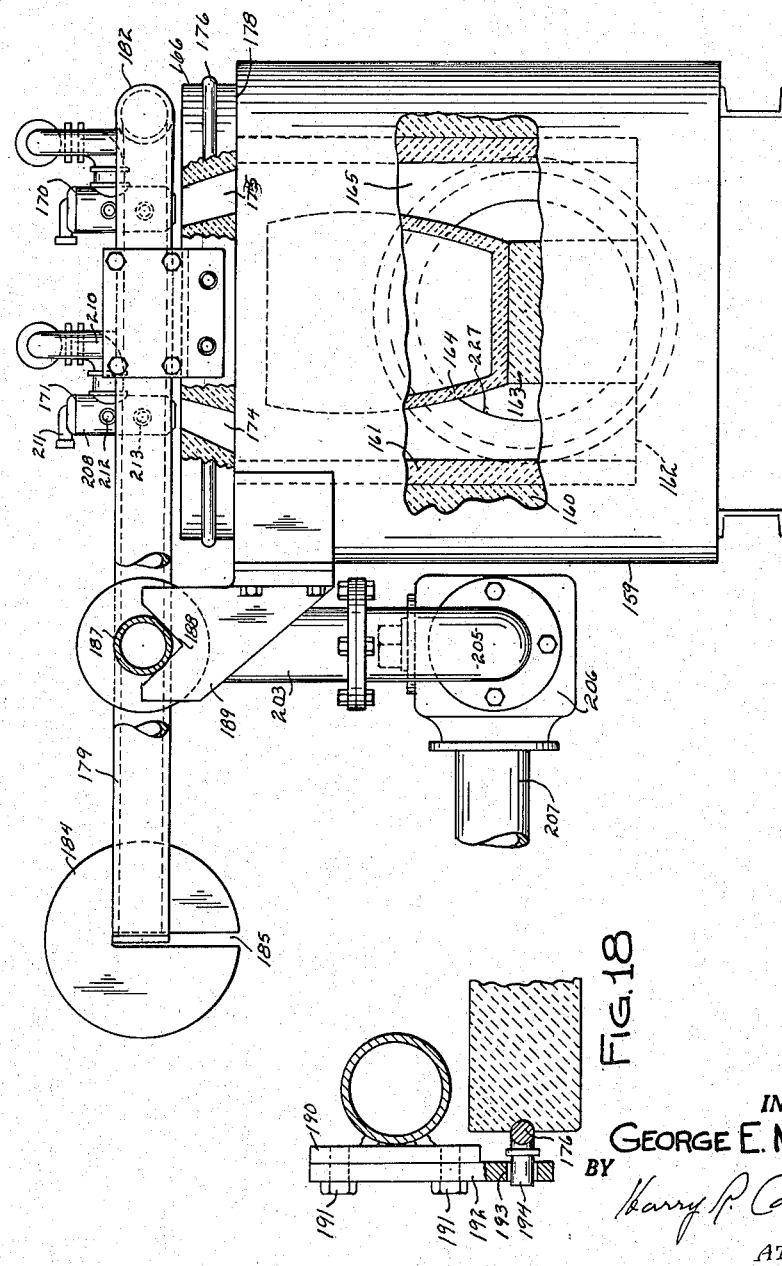

Oct. 20, 1953          G. E. MARKLEY                2,656,171
         FURNACE FOR HEATING CRUCIBLES AND THE LIKE
Filed May 13, 1947                              16 Sheets-Sheet 13
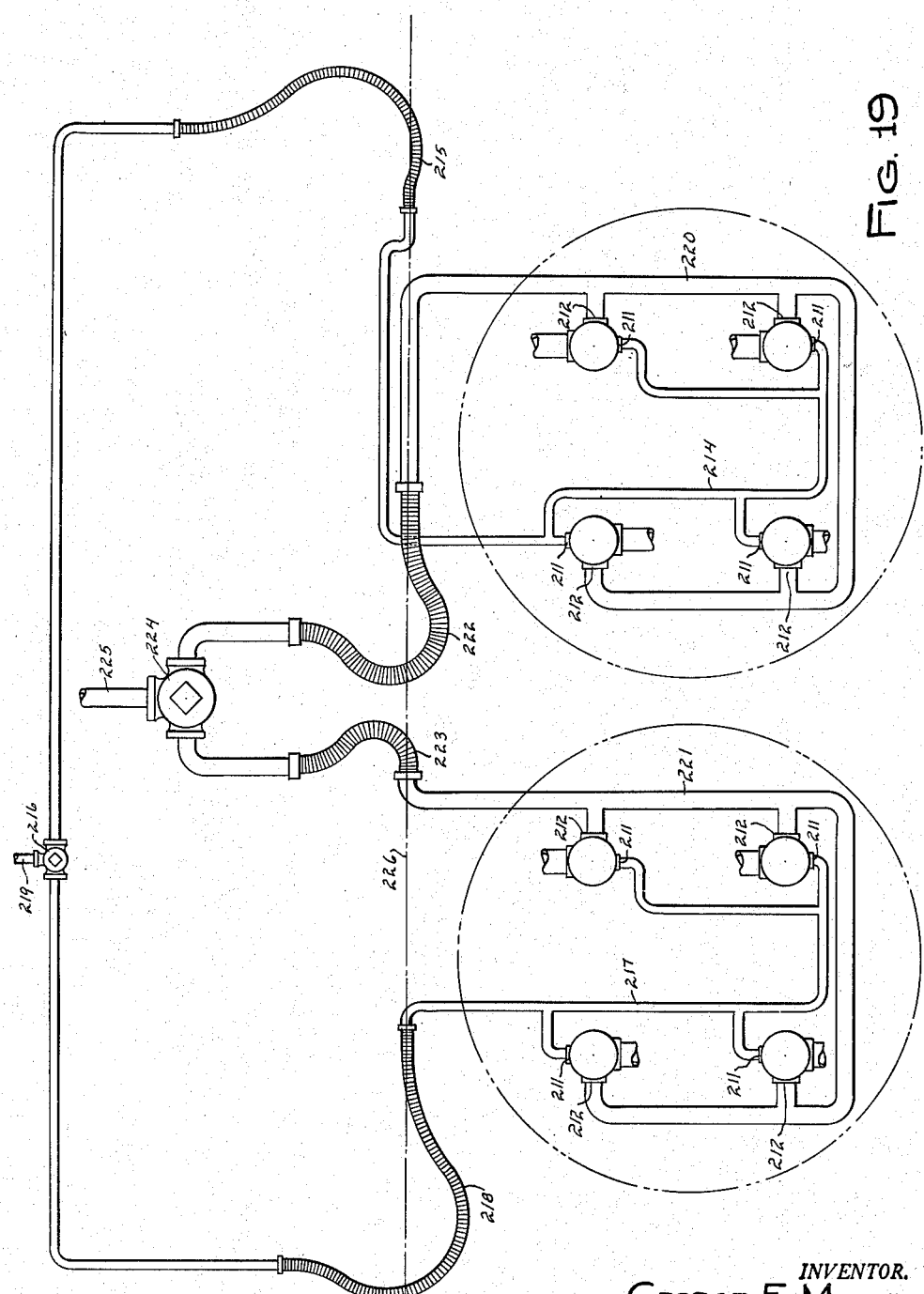
INVENTOR.
GEORGE E. MARKLEY
BY
    Harry P. Canfield
                ATTORNEY

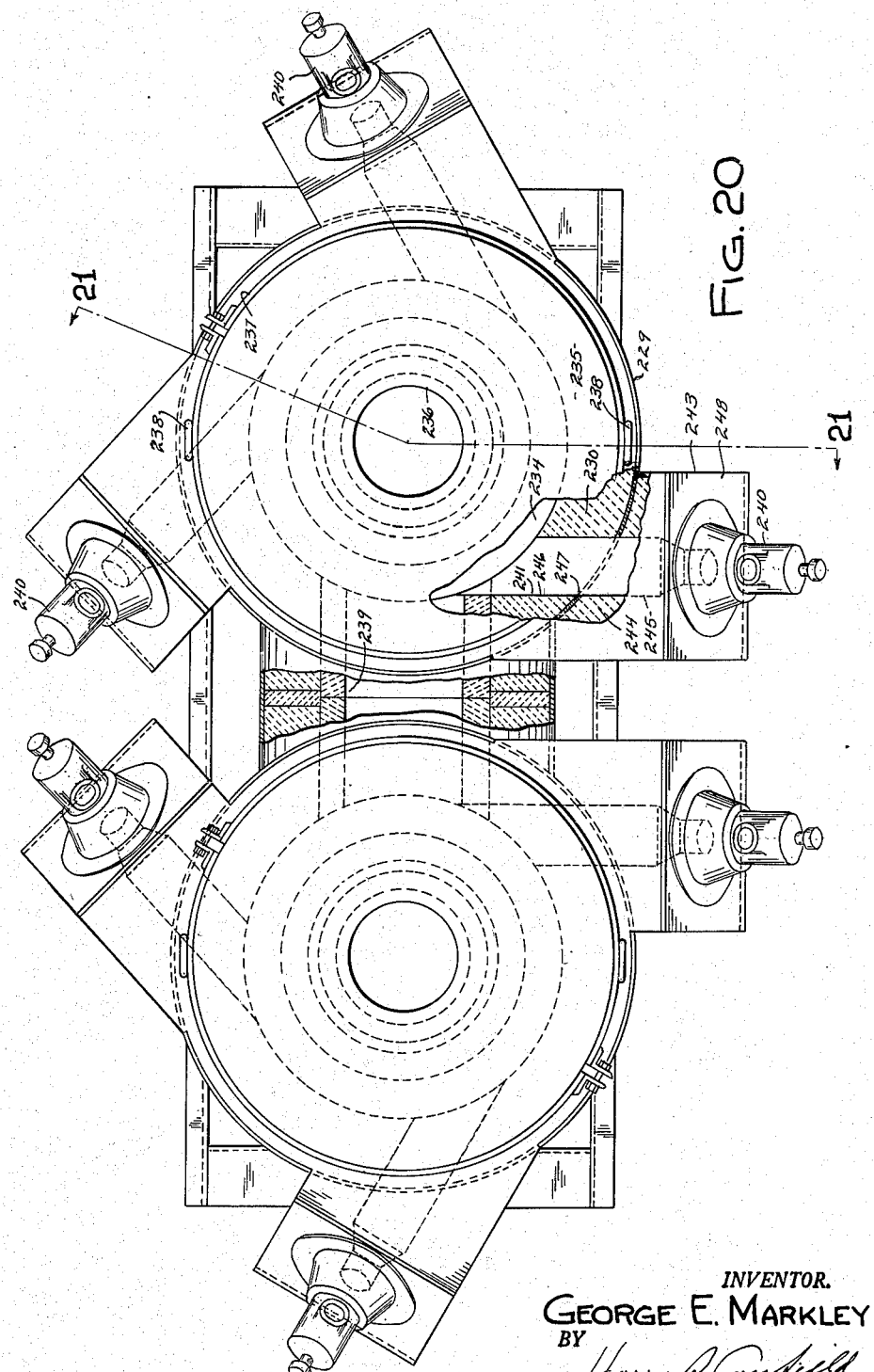

Oct. 20, 1953

G. E. MARKLEY 2,656,171

FURNACE FOR HEATING CRUCIBLES AND THE LIKE

Filed May 13, 1947

INVENTOR.
GEORGE E. MARKLEY
BY
*Harry P. Canfield*
ATTORNEY

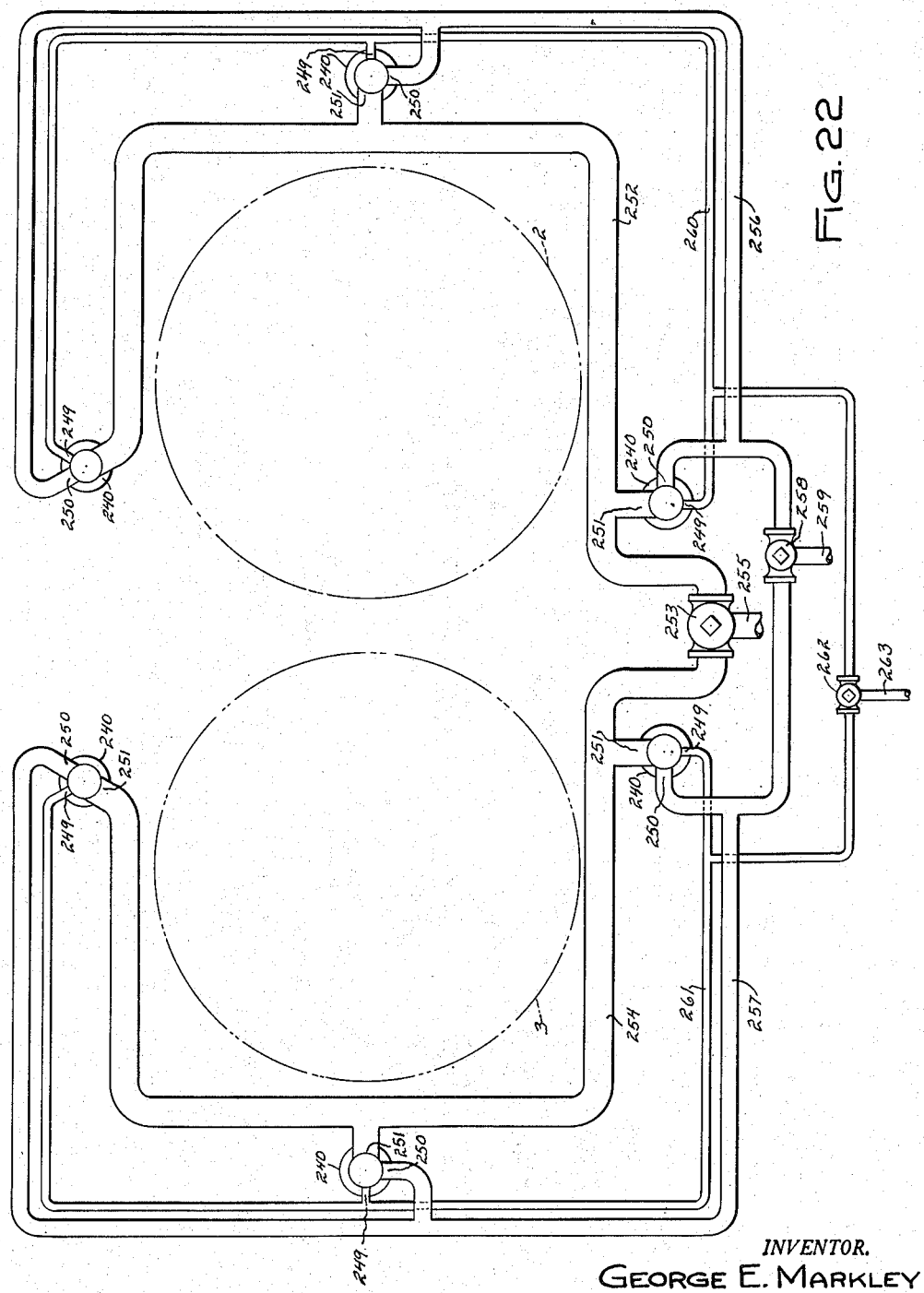

Patented Oct. 20, 1953

2,656,171

UNITED STATES PATENT OFFICE 2,656,171

FURNACE FOR HEATING CRUCIBLES AND THE LIKE

George E. Markley, Cleveland Heights, Ohio

Application May 13, 1947, Serial No. 747,686

4 Claims. (Cl. 263—14)

This invention relates to furnaces for heating crucibles and the like.

The invention is applicable to various uses in the various arts including among others the heating of cyanide and other salts in pots for metallurgical processes, the heating of boxes or other containers of coiled material for annealing, etc., but perhaps its most important use is in the heating of ceramic crucibles to melt metal therein, and it will therefore be illustrated and described herein as particularly applicable to that use. Its application to other uses will then become apparent to those skilled in this art without further illustration or description.

Crucible heating furnaces have heretofore comprised, in general, a refractory-walled chamber open at the top in which the crucible is placed, with a combustion space surrounding it in the chamber. Fuel, usually a combustible mixture of gas and air, is conventionally conducted through the wall of the chamber and burned in the combustion space, at or near the bottom of the crucible. The exterior surface of the crucible or container is primarily heated by the flame from the burners impinging thereon, and secondarily by the convection of hot gases in the combustion space, on their way out at the top of the chamber, where they discharge into the atmosphere.

Crucibles for melting metal in any case have a limited life, that is, are good for only a limited number of heats, and when fired in this manner their life is further shortened by deterioration, because the fuel flame impinging upon the crucible wall must, for the sake of thermal efficiency, have a velocity sufficient to prevent the presence of a heat insulating film on the crucible, and this high velocity and the cutting action of the flame rapidly abrades and destroys the material of the crucible.

Again, the burners themselves for practical reasons usually comprise tunnels in the refractory wall of the chamber, at or in or near the bottom of the chamber; and if, as frequently happens, the crucible develops a crack in its wall, molten metal may leak out of the crucible, and run into and clog the tunnels; and to clean, or as in some cases, to rebuild them to restore them, is a time consuming and expensive operation and requires the shutting down of the furnace.

Again, in the conventional crucible furnace, a great deal of the heat supplied by the fuel is wasted. Fuel must be supplied at a rate sufficiently great to raise the temperature of the metal in the crucible to the melting point, and at high velocity as referred to, and the burnt gas flowing upwardly and discharged from the top of the furnace inevitably contains heat units which are lost.

According to the present invention the crucible is heated by both radiation and convection, and there is little or no direct contact of the gas flame therewith. The burners are located above the lower part of the furnace and so that they can fire downwardly into the combustion chamber. They may be built into a removable unitary burner structure at the top of the furnace, and fire downwardly into the top of the combustion chamber. The burner tunnels are thus above the level where they would be subject to being clogged by molten metal in the event of cracking of the crucible as referred to. When the burners are built into a unitary burner structure as aforesaid, they can be replaced quickly by a spare burner unit, if, due to any cause, repair or renewal becomes necessary.

The hot products of combustion flow downwardly from the burners and around the crucible and out from the bottom of the furnace chamber.

The invention as briefly referred to above may be embodied in a single or unitary furnace.

This principle may also be utilized in the following manner to effect a greater useful absorption of heat than is possible in the conventional furnace.

The furnace in this case is of double or twin construction comprising two furnaces side by side in a unitary structure, each having a combustion chamber and a set of burners, as referred to. The fuel supply is controlled so that the burners of each furnace may be fired separately and alternately. An interconnecting passageway is provided connecting the lower portions of the two combustion chambers. The hot gases of combustion flowing downwardly and heating the crucible in one furnace, flow through the passageway and upwardly through the combustion chamber and around the crucible of the other furnace. While the metal in one crucible is being melted, the metal in the other crucible is being pre-heated. When the metal in the one crucible is melted that crucible may be removed and replaced by a fresh one; and a fresh supply of metal is put into the fresh crucible; the fuel is switched to the other furnace and it becomes the metal melting furnace; the burning fuel and hot products of combustion flow downwardly therethrough and in the reverse direction through the passageway and upwardly through the one furnace and pre-heat the fresh supply of metal in its crucible.

This operation is repeated continuously, radiant heat and burning fuel and hot combustion products melting the metal in one crucible and the remaining unburnt fuel and products of combustion pre-heating the metal in the other crucible, back and forth alternately.

Furnaces of this construction and as hereinafter described, have been put into practical operation, and by the conservation of heat as referred to, effect a saving of fuel between 30% and 50% for a given quantity of melted metal, as compared with the conventional furnace.

As will be more fully described, each of the twin furnaces may have a cover, or a cover and burner unit, readily removable, whereby the crucible containing the melted metal may be lifted out and replaced by a fresh crucible and fresh metal; or each furnace and its contained crucible may be of the tilting type and each separately tiltable to discharge the melted metal through the side of the furnace without removing the crucible.

The furnace may be heated with fluid fuel, either by burners burning gas mixed with air, or by burners burning oil atomized and mixed with air.

The furnace cover in each case may be provided with a central opening above the crucible through which metal may be added to either of the crucibles from time to time while being heated or pre-heated respectively.

As observed in operation, very little flame emerges from these central openings in the covers. In the melting half of the furnace this is true because the furnace chamber is fired from the top and the cross passageway to the other half is made large enough so that there is limited back pressure in combustion chamber; and in the combustion chamber of the other furnace, the combustion goes on to such completion that there is little combustible fuel left in the combustion gases by the time they reach the opening in the cover of that furnace.

This reduction of flame emerging from the furnaces, is evidence of a high degree of completeness of combustion; but it also renders the operation of the furnace less uncomfortable and less hazardous to the operators, resulting in greater efficiency in their work.

The metal put into the crucibles through the cover openings is often in the form of bars, or discarded foundry sprues and gates, and projects upwards out of these openings, and the heat of the small flame emerging from the openings is largely absorbed by this ingoing metal.

In view of the foregoing, it will be seen that the objects of the invention are, among others:

To provide generally an improved furnace for heating crucibles and other containers;

To provide generally a container-heating furnace having an improved mode of operation;

To provide a furnace for heating crucibles and other containers having a construction and mode of operation which increases the useful life of the furnace, the burners, and the crucible or container itself;

To provide a furnace for heating crucibles and other containers having an improved burner construction and mode of operation;

To provide a furnace for heating crucibles and other containers comprising an upwardly open furnace chamber in which the crucible or container is placed, and a burner construction for supplying heat downwardly into the chamber from above;

To provide a furnace for heating crucibles and other containers, utilizing principles of radiant heating, in an improved manner;

To provide a crucible heating furnace embodying improved means to conserve the heat units of the fuel;

To provide a twin type furnace of the type referred to hereinbefore, and having the advantages mentioned above among others;

To provide a twin furnace having the improved mode of operation referred to above;

To provide the improvements in the means and methods of heating crucibles and other containers, as described hereinafter and as particularly set forth in the appended claims.

Other objects will be apparent to those skilled in the art to which my invention appertains.

My invention is fully disclosed in the following description taken in connection with the accompanying drawing in which:

Figs. 1 to 7 illustrate a gas fired furnace embodying the invention, of a non-tilting type, and of which:

Fig. 1 is a top plan view, with a part thereof in section on a horizontal plane, identified as the plane 1—1 of Fig. 2;

Fig. 2 is a front elevational view with parts in longitudinal section; and with a lever of Fig. 1 omitted for simplification;

Fig. 3 is an end elevational view from the right hand end of Fig. 2 with parts in section;

Fig. 4 is a fragmentary sectional view from the plane 4—4 of Fig. 1;

Fig. 5 is a bottom plan view of a burner and cover unit taken from the plane 5 of Fig. 2;

Fig. 7 is a fragmentary sectional view from the plane 7—7 of Fig. 6; and with,

Fig. 6 is a view similar to Fig. 5 but showing a modification;

Figs. 8 to 12 illustrate a furnace generally of the construction of that of Figs. 1 to 7, but of a tilting type, and of which:

Figure 10:
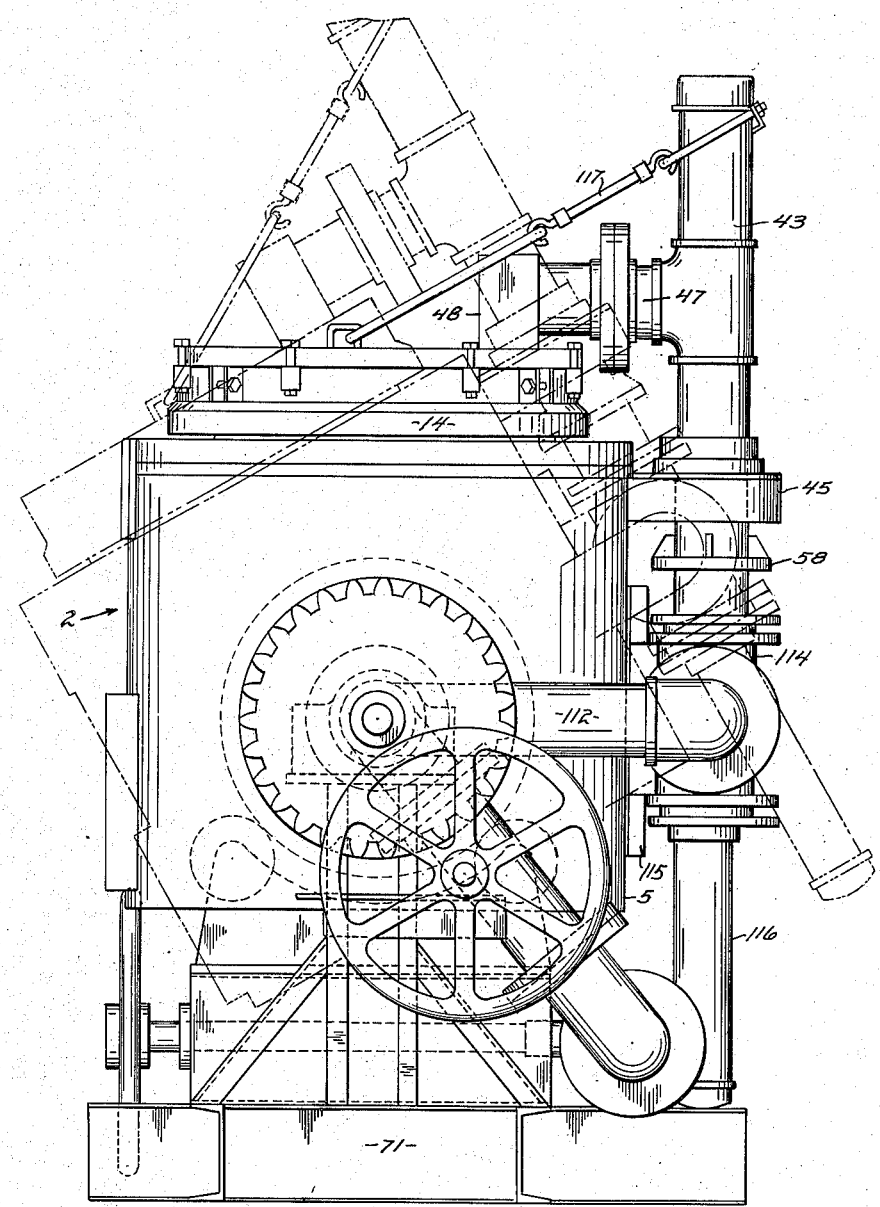
Figure 11:
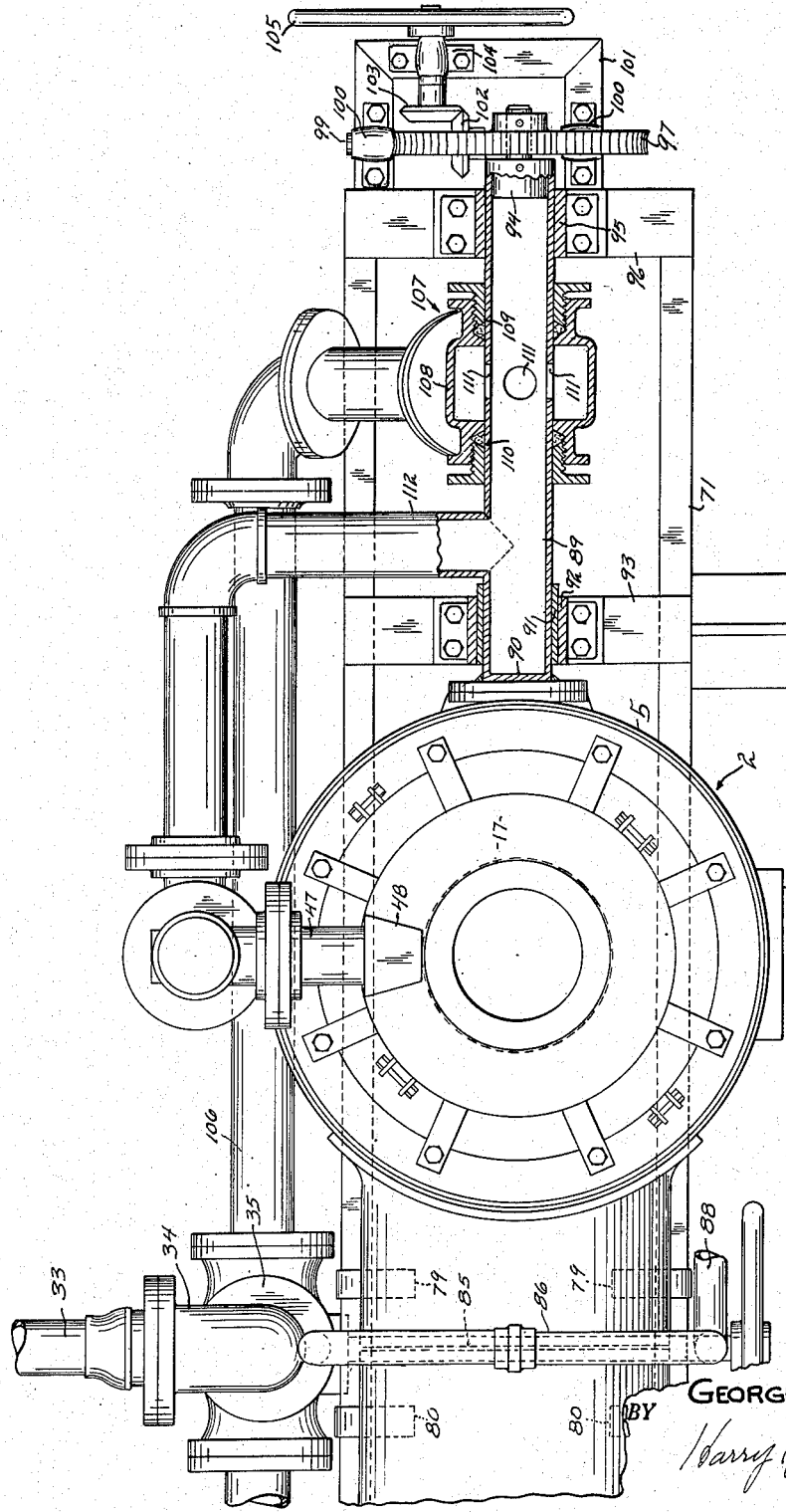
Figure 13:
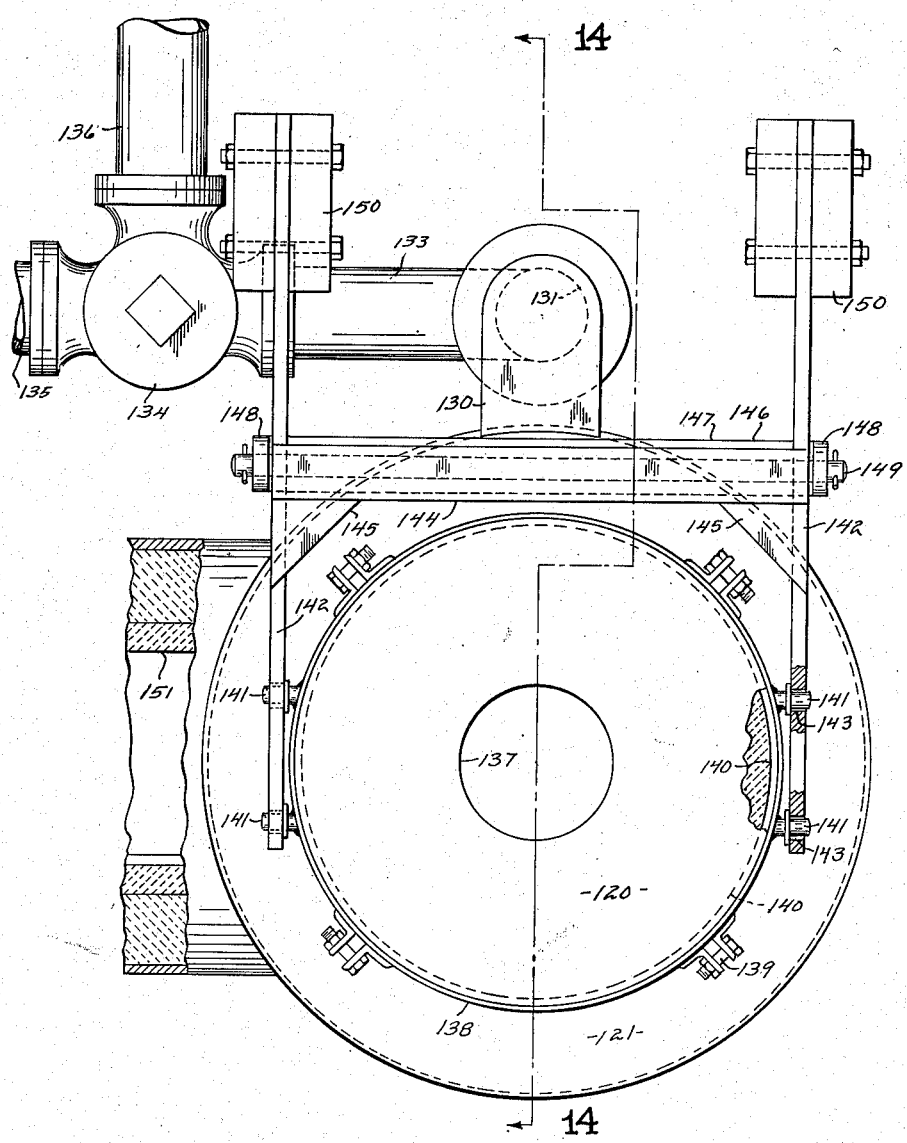
Figure 14:
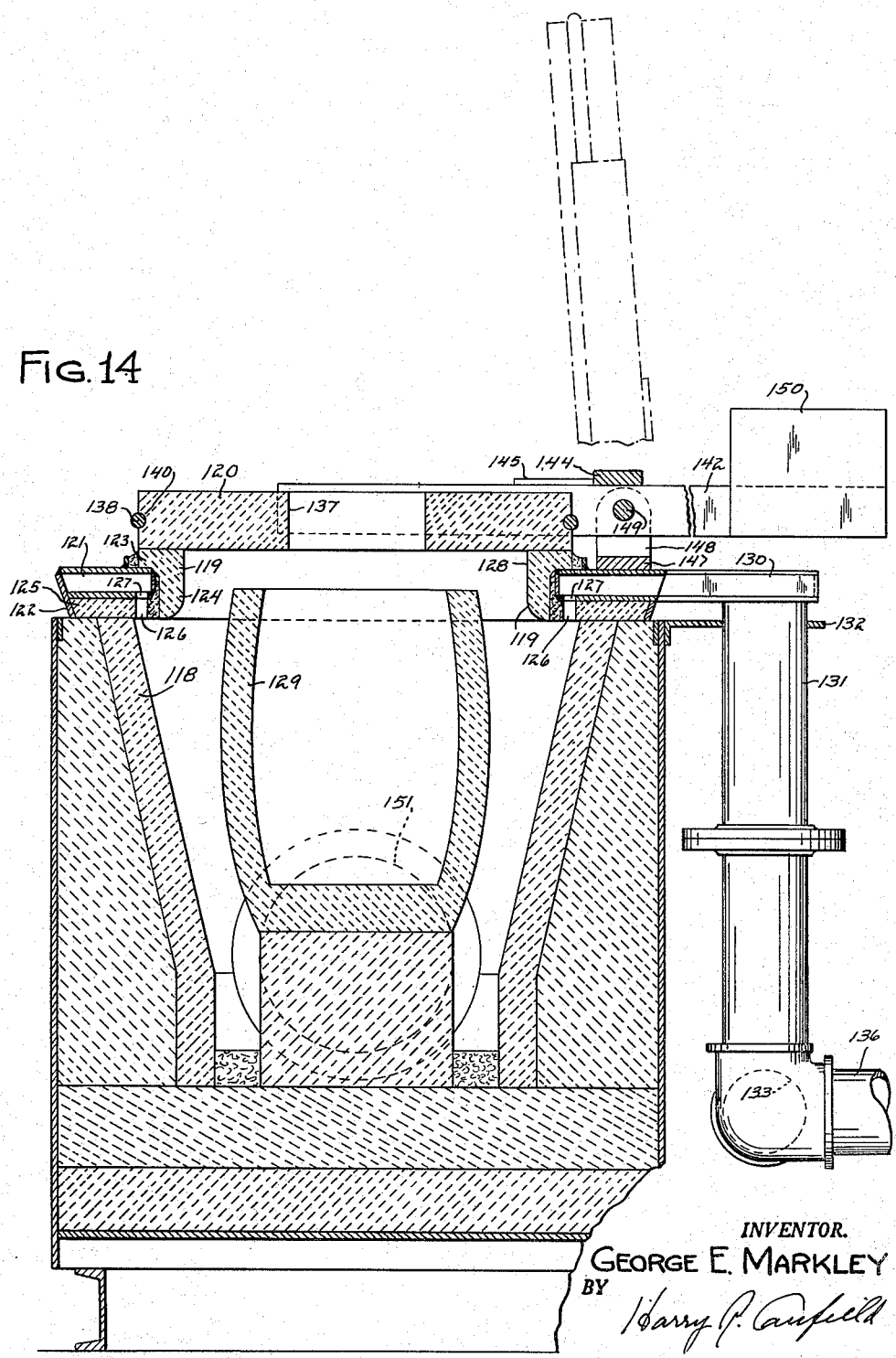
Figure 21:
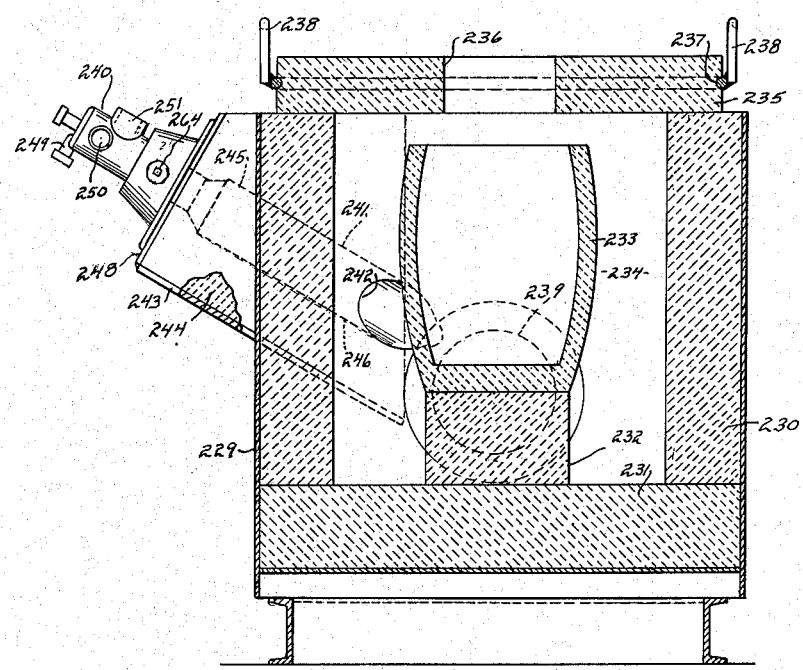

Figs. 8 and 9 taken together are a front elevational view with parts in longitudinal section;

Fig. 10 is an end elevational view taken from the right hand end of Fig. 9;

Fig. 11 is a top plan view of the parts of Fig. 9 with parts in longitudinal section; and, Fig. 12 is a fragmentary sectional view from the plane 12—12 of Fig. 8 with the parts in the tilted position indicated by broken line in Fig. 10;

Figs. 13 and 14 illustrate a furnace of the non-tilting type of which is a modification of that of Figs. 1 to 7, and which:

Fig. 13 is a top plan view of the right hand half, with parts in longitudinal section; and, Fig. 14 is a sectional view from the plane 14—14 of Fig. 13;

Fig. 15 is a top plan view of the right hand half similar to Fig. 13, but showing its adaptation to a furnace of the tilting type;

Figs. 16 to 19 illustrate a form of a non-tilting furnace of the type of Figs. 1 to 7 which may be fired by either oil or gas and of which:

Fig. 16 is a top plan view, with some of the duplicate parts omitted and parts in section;

Fig. 17 is a side elevational view of the left hand end of Fig. 16, with parts broken away and parts in section;

Fig. 18 is a fragmentary sectional view from the plane 18 of Fig. 16; and,

Fig. 19 is a diagrammatic view of piping connections for Fig. 16 but omitted from that figure for simplification;

Figs. 20 to 22 illustrate another form of a non-tilting furnace of the type of Figs. 1 to 7 which may be fired with oil or gas and of which:

Fig. 20 is a top plan view with parts broken away and parts in section;

Fig. 21 is a sectional view from the plane 21—21 of Fig. 20; and,

Fig. 22 is a diagrammatic view of piping connections for Fig. 20 but omitted from that figure for simplification.

Referring to the drawing and to the form of the invention in Figs. 1 to 7 inclusive, there is shown a supporting frame 1—1 made from rolled-section steel; upon which are supported two furnaces preferably identically alike, shown generally at 2 and 3. Each comprises an upwardly open chamber provided by an enclosing side wall 4 of refractory material, preferably of circular cross section, contained in an outer sheet steel shell 5, and a refractory bottom or floor 6, which may be a separate piece as shown. A block or stool 7, rests upon and is centered in a recess in the floor 7, and upon it is supported a crucible 8.

The inside of the furnace wall 4 is lined with a refractory liner 9, of high-temperature supporting refractory material, which can attain an incandescent temperature without excessive deterioration, suitable known materials being silicon carbide or fused aluminum oxide. The liner 9 is shown in one pre-formed piece but may be made up of separately pre-formed pieces. While this liner by its construction and position is a furnace chamber "liner," in action it functions as a part of the heating equipment as will become clear later.

Tubular combustion chambers 10—10 are thus provided, by the liners 9—9, floors 6—6, stools 7—7, and the crucibles 8—8. The two combustion chambers 10—10 near the lower ends thereof are connected by a passageway 11 extending through the walls 4 and liners 9, and lined by a tubular refractory liner 12, surrounded by the refractory material of the adjacent walls 4—4.

Figure 1:
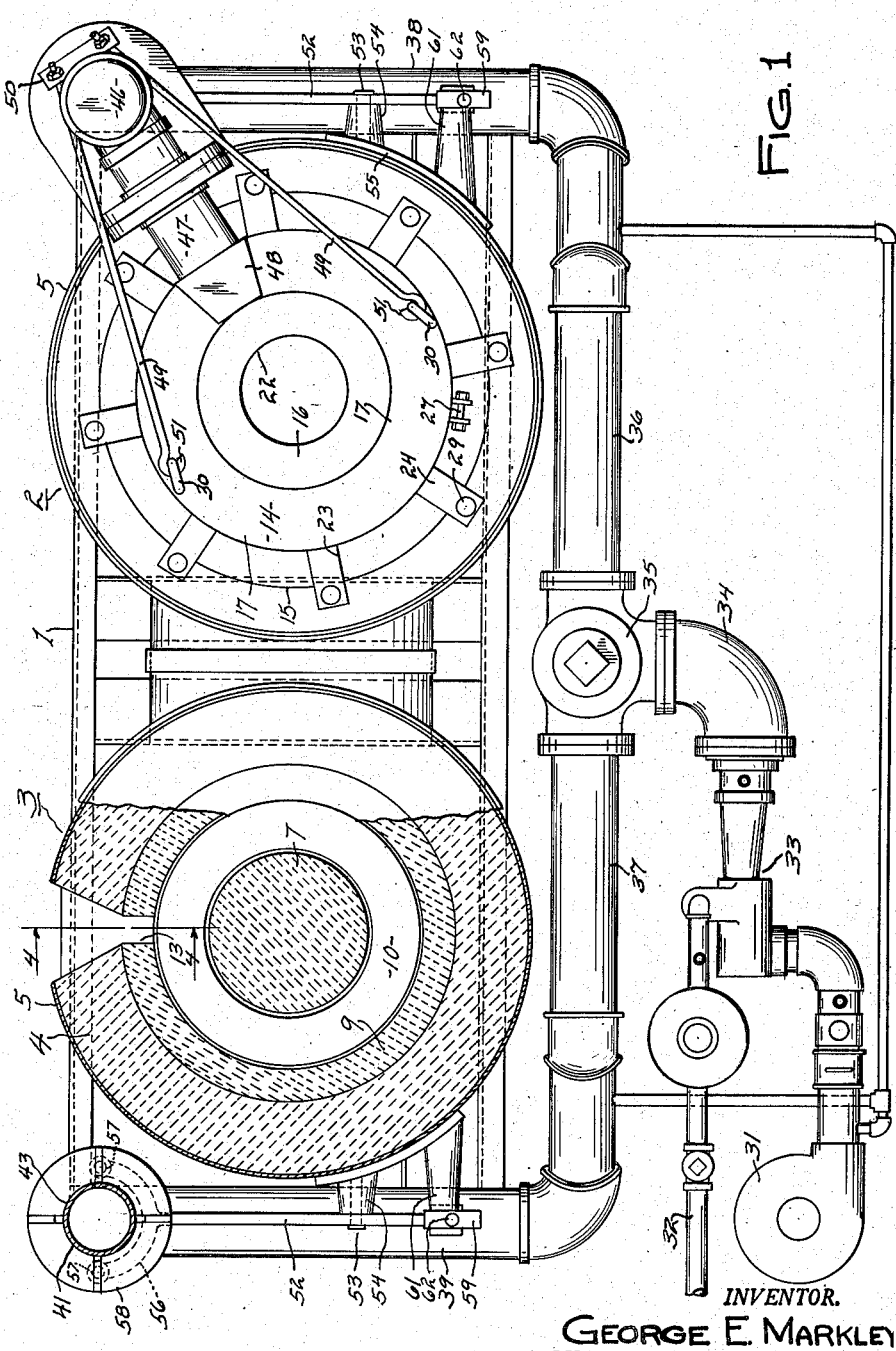
Figure 2:
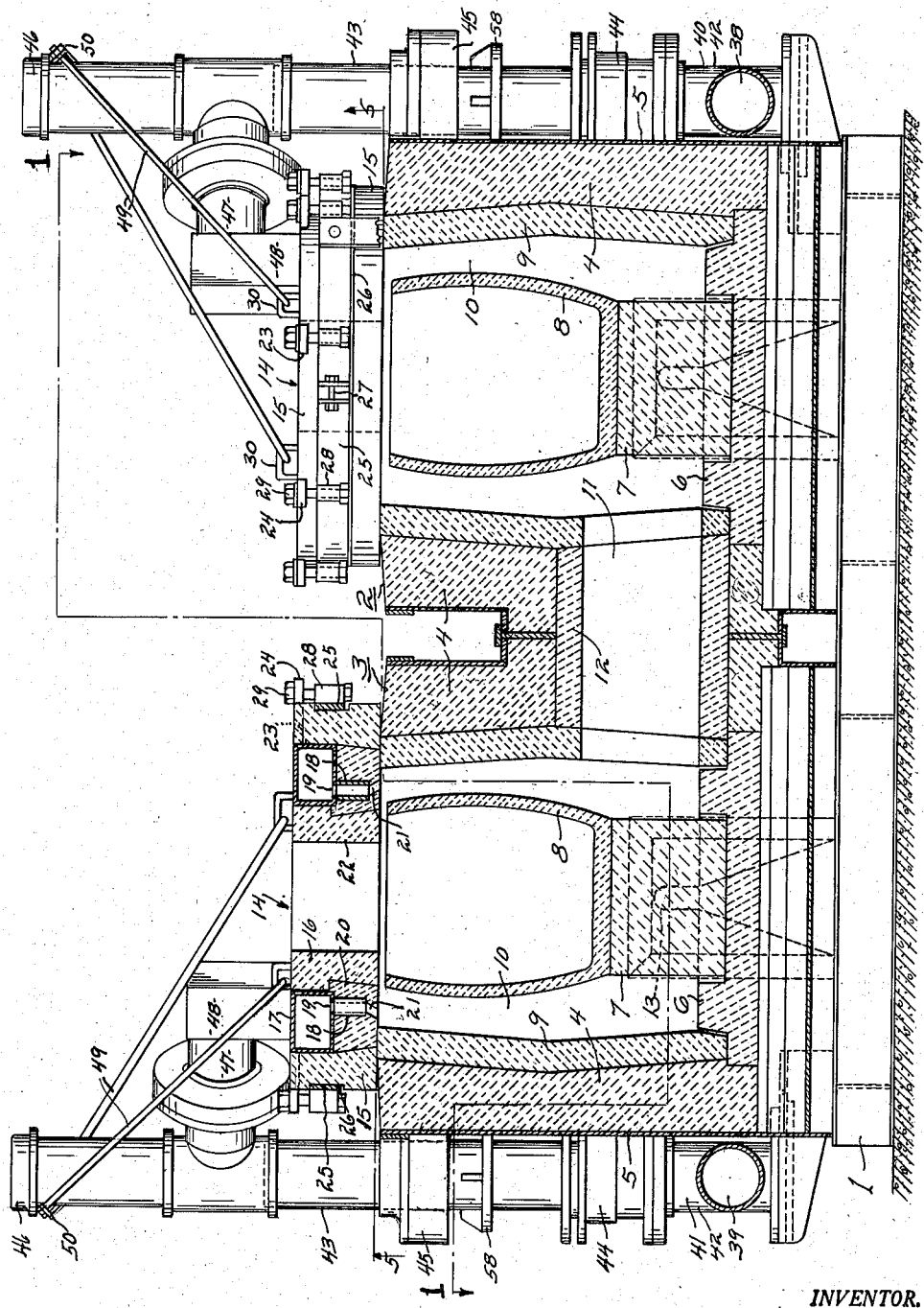
Figure 4:
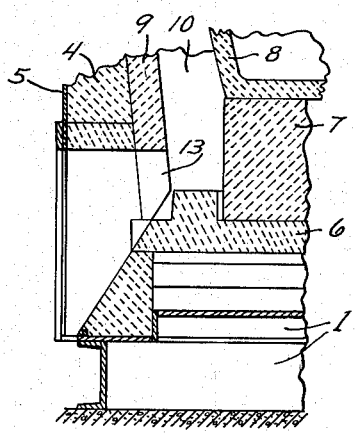

At the back side of the furnaces (as viewed in Fig. 2) each has a small slag discharge orifice 13, opening outwardly and downwardly divergently from the combustion chamber 10 at a point adjacent to the floor 6, best shown in Figs. 1 and 4 but indicated in dotted line in Fig. 2, out of which, slag, accumulating at the chamber bottom from fused refractory of the crucible and other parts may flow by gravity.

Resting by gravity upon the top of each of the furnaces but preferably upon the upper end of the liners 9 is a unitary cover-and-burner structure indicated generally at 14. It comprises a pre-molded outer annulus 15 and inner annulus 16 of refractory material; and an annular duct 17 made from sheet metal and placed between the said annuli, the space between the annuli and under the duct being thus pre-formed to be of upwardly divergent wedge shape in cross section. A plurality of tubular metal tunnel liners 18—18 are welded to the under side of the duct 17 and project downwardly between the annuli 15—16, and communicate with the duct interior through perforations 19. The space between the annuli and the duct is tamped and filled in with setting refractory cement or the like 20 compactly surrounding all of the liners 18 and molded to have burner tunnels 21 continuous with the liners 18. The lower faces of the annuli 15—16 and the filled in refractory 20 are in a plane and the tunnels 21 are open at this face.

The annular form of the inner annulus 16 provides a central opening 22 in the cover.

The top surface of the outer annulus 15 has a plurality such as eight radial recesses 23 in it. Radial metal fingers 24—24 lie in these recesses, and are welded at their inner ends to the duct 17. A band 25 of steel surrounds the cover, and may lie in a groove 26 in the outer annulus 15 and may be drawn tight by bolts 27 in a well known manner; and has a plurality of eyes 28 welded thereto. Bolts 29 project through the eyes and through corresponding perforations in the fingers 24 and thus firmly secure the duct 17 in the cover. A pair of rings or eye bolts 30—30 are secured at diametrically opposite points to the top of the duct 17, for a purpose to be referred to.

Figure 5:
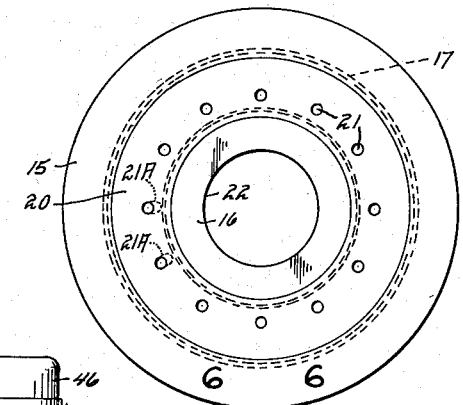

The tunnels 21 are in a circular series as shown in Fig. 5; and their axes, particularly at their lower open end portions, are inclined outwardly toward the liner 9, Fig. 2.

Provision is made to supply a flow of combustible gaseous fuel to the annular duct 17 and thence to all of the burner tunnels 21; and to permit the cover 14 to be raised and lowered and swung to one side or the other and back again, without breaking the conduit line of flow of the fuel; and this will now be described.

In Fig. 1 at 31 is an air blower, and at 32 a gas supply pipe. By apparatus of known or any suitable construction such as a Venturi mixer indicated generally at 33, a combustible mixture of air and gas is supplied, at predetermined pressure and velocity, to a fuel main 34 leading to a three-way two-port manually operable valve 35. By operating the valve 35 the combustible fuel may be switched to one or the other of right hand and left hand branch mains 36 and 37; which extend across the front of the furnaces and then as at 38 and 39 rearwardly across the ends of the furnaces where they join vertical riser mains 40 and 41.

Figure 3:
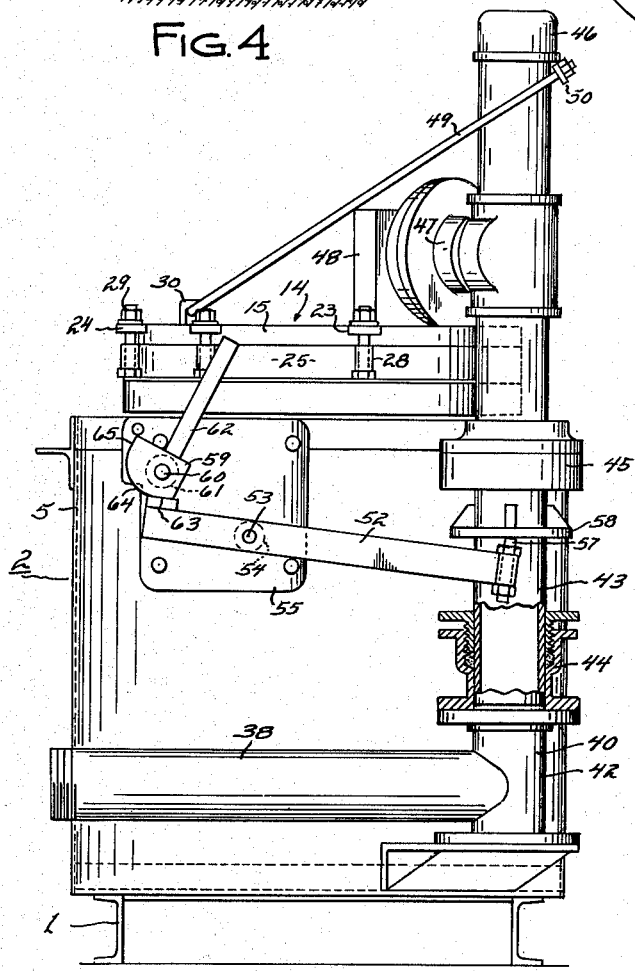

The riser mains are each in two vertically aligned parts, a lower riser 42 and an upper riser 43 connected together by a packed and leak-proof sliding joint shown generally at 44 which as shown in Fig. 3 will be recognized as of known construction, and which as will be understood permits the upper riser 43 to be reciprocated vertically, and to rotate, relative to the lower riser 42. A guide 45 mounted on the furnace structure above the sliding joint 44 and through which the upper riser 43 has a sliding fit guides the movement of the upper riser 43.

Above the furnace the top of the upper riser 43 is closed by a cap 46. Below the cap the upper riser 43 is connected by a branch 47 to a depending sheet metal box-like duct 48, which is welded to and discharges gas into the said annular duct 17 in the cover 14.

The cover 14 is connected to the upper riser 43 so as to move vertically and rotate with it. This may be done by any suitable means, that shown comprising links 49—49 straddling the upper riser 43, connected at one end to a transverse bar 50 welded to the back side of the riser 43, and extending downwardly therefrom divergently, and at their lower ends having hooks 51—51, hooked into the said rings 30—30 welded at diametrically opposite points on the top of the duct 47.

When the upper riser 43 moves upwardly, the links 49 exert balanced upward pull on the cover 14; and the construction comprising the branch main 47 and the duct 48 connected to the cover, hold the cover away from the upper riser 43 so that it is constrained to move vertically with the upper riser 43.

The upper riser 43 and its attached cover, move downwardly by gravity. The cover is stopped and comes to rest upon the top of the furnace as described; the upper riser 43 is stopped and supported independently of the cover as will be described. The slight flexibility of the sheet metal duct 48 and the loose hook and eye connection at 30—49 permit the cover to align itself with and seat tightly upon the top of the furnace.

To move the upper riser 43 upwardly, and also support it independently in its down position, see Fig. 3, a lever 52 is provided having a pivot support at 53 intermediate its ends, on a bracket post 54 (Fig. 1) connected to a plate 55 secured to the side of the furnace. The outer end of the lever 52 has a fork 56 (left side of Fig. 1) and adjustable studs 57—57 are provided in the ends of the fork, engaging the underside of an annular flange 58 welded to the upper part 43. The other end of the lever 52 lies under a cam 59 pivoted at 60 upon a bracket post 61 (Fig. 1) on the plate 55 and provided with a handle 62 to rock the cam.

The cam has a flat face 63 engaging the upper side of the lever, and preventing clockwise rotation of the lever as viewed in Fig. 3 and holding the handle 62 in a suitable upright position. By adjusting the studs 57—57 the weight of the upper riser 43 is transferred through the flange 58 and lever 52 to the cam 59, and supports the upper riser 43 in the desired down position.

The cam 59 has a curved camming surface 64 followed by another flat face 65. Upon rocking the cam by the handle 62, the camming surface rocks the lever 52 and raises the upper riser 43 and the attached cover 14, and when the other flat face 65 engages the lever, the handle 62 may be released and the elevated parts thus elevated will be locked in elevated position as will be understood.

The said sliding joint 44, besides allowing sliding vertical movement of the upper riser 43, also allows it to rotate on its axis in the sliding joint. After the cover has been raised as described to free it from the top of the furnace, the cover may be swung manually laterally or rotated together with the upper riser 43 to a lateral position giving free access to the furnace chamber for removing the crucible 8 and replacing it with a fresh one; the usual crucible tongs and their supporting apparatus being suitable for the purpose. Similarly the cover may be rotated back to its covering position, and lowered upon the furnace by reverse operation of the cam handle 62.

The twin furnace construction above described is, as shown, identical for both halves of the furnace.

In the operation of the furnace above described, pieces of metal to be melted are charged into both crucibles 8—8. The valve 35 of Fig. 1 is turned to supply combustible gas to say the left hand furnace 3, and flows out of all of the burner tunnels 21—21 in the cover 14. It may be ignited in any convenient manner by slightly raising the cover, or by an igniter passed through the central opening 22.

Because of the angular inclination of the burner tunnels, the fuel flames emerging therefrom enter the top of the combustion chamber 10, and impinge upon the liner 9 and flow downwardly over it and along its surface heating it to incandescence. This also sets up convection of the burning gas in the combustion chamber 10. The crucible 8 and its contents are heated by the convection of the burning gas in contact with it, and also by radiant heat from the liner 9.

The metal in the crucible 8 begins to melt and settle, and additional metal may be added from time to time through the central opening 22 of the cover to provide a full crucible of melted metal.

The hot gases of combustion, due to the velocity of flow and pressure in the combustion chamber 10 flow out from the bottom of the combustion chamber, through the connecting passageway 11 and into the bottom of the combustion chamber 10 of the right hand furnace 2 and upwardly therethrough. The gaseous products of combustion may contain some unburnt gas, which continues to burn in the right hand combustion chamber 10. The heat of both the burning gas and the hot gaseous products of combustion heat or pre-heat the right hand crucible 8 and its contents.

The final products of combustion flow out of the top of the right hand combustion chamber 10 through the central opening 22 of the cover 14.

There will usually be a small flame emerging out of the central cover opening of the right hand furnace, and the pieces of charged metal may be long enough to project outwardly through this central opening or if smaller may span the opening and be piled up on the cover at the opening, and are preheated by and absorb heat from the emerging flame.

When the left hand crucible 8 has a suitable filling of melted metal, the gas supply is switched to the right hand furnace 2 by the valve 35; the left hand cover 14 is raised and swung to the side; the left hand crucible 8 is lifted out and taken away, and is replaced by a fresh crucible and charged; and the cover replaced.

The right hand crucible is now subjected to the primary heat, and left hand crucible is subjected to the preheating heat as described above. The operations above described for the left hand and right hand crucibles respectively are now performed for the right hand and left hand crucibles respectively; and so on, repeating cycle after cycle for the two crucibles alternately as will be understood.

Among the potentialities and advantages of the invention as thus described, and which may be enjoyed with the other forms to be described are as follows:

Firing the combustion chamber downwardly from the top causes the hottest zone in the chamber to be low down on the crucible where the melting of the metal takes place primarily; and the melting of the metal is thus accelerated.

The crucible, not being subjected to direct contact with the flame, but being heated by convection of the hot gases and by radiation from the liner, has its useful life prolonged.

The cover being on top of the furnace, rapidly radiates heat to the surrounding atmosphere; and furthermore is not subjected to intense heat because the flame is primarily projected downwardly away from it. It therefore remains relatively cool and its useful life is thereby prolonged.

The burners and burner tunnels likewise being removed from the hottest part of the combustion chamber and being cooled by the incoming gas, flowing through a relatively cool cover, remain relatively cool and the molded tunnels have longer life, and being at the top cannot become plugged with slag, or melted metal as referred to.

The radiating liner, not having burner tunnels going through it is simpler to make and easier to install and does not have to be replaced because of burner tunnel deterioration therein; and hence needs to be replaced less frequently.

The operators work more efficiently, and more skilled workmen are willing to work at the furnace, to charge and tend the crucibles, because the objection to prior furnaces fired from the bottom which have a hot blast of burning gases coming out of the furnace top, is absent.

Heating of the metal proceeds at a faster rate due partly to the manner in which the heat is applied to the melting crucible, and partly due to pre-heating of the crucible, the time required to produce a crucible full of melted metal from the time the melting heat is turned on, being about one-half as long a time as that in furnaces of the conventional construction.

The shortened time during which melting is going on reduces oxidation of the metal.

The operation is quieter than in prior constructions because the roar of combustion is reduced, inasmuch as there are two combustion chambers in which the gas burns, and consequently a doubled combustion chamber volume.

There is low pressure at the top of each of the furnaces due to the construction and mode of operation described and hence no objectionable leakage of flame laterally under the covers.

There is also the primary improvement mentioned hereinbefore of the enormous saving of fuel, enough in fact to pay for the entire installation in a fraction of its useful life.

Figure 6:
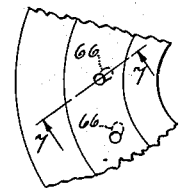
Figure 7:
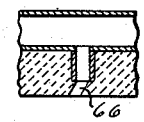

In some cases, it may be desirable to keep the burning gas longer in contact with the radiating liner and to increase the gas convection in the combustion chamber, and this may be done by directing the burner tunnels not only at an angle toward the liner but concurrently at a tangential angle also, thereby causing the flame to move downwardly spirally over the liner. In Fig. 5, some of the burner tunnels 21 are shown in dotted line as at 21a as indicating their inclined direction corresponding to Fig. 1, and described above. Fig. 6 shows a fragment of the cover, corresponding to a part of Fig. 5, but with the burner tunnels 66 shown in dotted line as indicating their direction for projecting the flame downwardly spirally as referred to; Fig. 7 (referred to Fig. 6) further illustrating their direction.

In the foregoing where metal parts are shown joined together and the means for effecting the juncture are not shown they may be considered as welded together according to well known practice.

In Figs. 8 to 12 is illustrated another form of the invention.

With reference to this form, it is known practice in crucible furnaces to provide the crucible with a spout at the top projecting through the furnace wall, and to discharge molten metal therefrom by tilting the furnace and crucible.

In Figs. 8 to 12 is illustrated a pair of furnaces 2—3 like those of Figs. 1 to 7 above described but having this tilting mode of operation.

Generally speaking the interior construction of the furnace and the source of supply of mixed air and gas, may be the same as for Figs. 1 to 7, and it is not necessary to repeat all of this for Figs. 8 to 12; but in Fig. 12 are shown the furnace interior differences which adapt it to discharge by tilting, the reference characters for like parts of Figs. 1 to 7 being the same as in those figures.

The furnace wall 4 and liner 9 and steel shell 5 are all notched out at the top as at 66; and when the cover 14 is in place overlapping the notch, the notch 66 becomes an opening through the side of the furnace. The crucible, here 8A, has a spout 67 at its top, and may be of conventional form in this respect. The opening 66 has a floor 68 provided by a metal piece attached to the steel shell 5 and covered by refractory cement or the like. A block or bridge 69 of refractory material may be provided between the liner 9 and crucible 8A.

The furnace as a whole is shown in tilted position in broken lines in Fig. 10; and the parts within it then take up the positions in Fig. 12. Melted metal in the crucible flows out as indicated at 70. The tilted crucible is prevented from shifting on the stool 7 by the block 69.

The cover 14 is prevented from shifting by gravity in the tilted position, by its attachment to the upper gas fuel riser 43 as described hereinbefore, and this is apparent in Fig. 10.

As shown in Figs. 8 to 11, there is a steel base frame 71; but the furnaces proper 2—3 do not rest on it. As shown in Figs. 8 and 9, which illustrate respectively the left half and the right half of the structure, and as indicated in Fig. 11 for the right half, the two furnaces 2 and 3 are spaced apart farther than in the form of Figs. 5 to 7. Secured to their adjacent exterior furnace housing shells 1 are tubular cylindrical axially aligned shells 72—73, within which are refractory walls 74—75 and axially aligned refractory liners 76—76 providing jointly an interconnecting passageway 78 (corresponding to, and for the same purpose as, the passageway 11 of Fig. 2 as described). The tubular shells 72—73 function as trunnions and will be so designated. Each of the trunnions 72—73 rests upon a pair of roller bearings 79—79 and 80—80, rotatably supported in brackets 81—81 resting upon a common base 82 which in turn is supported on the main steel base frame 71.

The two furnaces have independent rotation or tilting oscillation on these bearing supported trunnions 72—73 and to this end, the two refractory walls 74—75, and liners 76—77 terminate in transverse adjacent confronting planar ends as at 83—84, and with a thin clearance space 85 between them. Gas flowing through the passageway 78 would tend to leak out at this clearance space 85 and this is prevented by the provision of an annular ring of pipe 86 surrounding the clearance space 85 and having a series of jet ports 87 open toward and opposite the space; and the pipe 86 is connected to an air supply pipe 88 Fig. 11 leading to an air supply blower (not shown but which as stated may be as in Figs. 1 to 8); and the air under pressure emerging in jets from the ports 87, subject the clearance space 85 to external pressure greater than the internal pressure in the passageway 78.

The opposite sides of the respective furnaces are also supported on other trunnion bearings, which will now be described, and it is upon the common axis of the two trunnions of each furnace, that it is tiltingly oscillated or rocked, independently of the other. The other trunnion bearing comprises in each case a gas fuel pipe 89 closed at one end as at 90 and secured to the side of the furnace, and having a sleeve 91 around it for rotating in a bearing 92, supported on a bearing frame 93. The opposite end of the pipe 89 is also closed as at 94 and rotates in a similar bearing 95 mounted on a bearing frame 96, both bearing frames 93 and 96 being supported on the base frame 71. The pipe 89 may therefore be called a trunnion pipe.

To supply torque to the furnaces or to each of them, to rock them, I prefer to employ the following arrangement with particular reference to Fig. 11.

A worm gear 97 is secured to the end of the trunnion pipe 89 and meshed with a worm 98 having a shaft 99 rotating in bearings 100—100 on a bearing frame 101 secured to the bearing frame 96. Secured to the shaft 99 is a bevel gear 102, meshed with a bevel gear 103 whose shaft rotates in a bearing 104 on the bearing frame 101 and has a hand wheel 105 for turning it. Obviously turning the hand wheel 105 will rotate the trunnion pipe 89 and the attached furnace, and the worm gear part of the transmission prevents overhauling travel of the furnace.

Gas fuel is supplied to the interior of the trunnion pipe 89. It goes from a source 33—34 of mixed gas and air (for example by the arrangement of Fig. 1) under control of a three-way two-port valve 35, to a right hand main 106 and thence to a rotary gas joint 107. This rotary joint comprises a housing 108 with which the main 106 communicates, and through which the trunnion pipe 89, extends and in which it rotates, it being sealed where it passes through the housing 108 by packing glands at 109 and 110 of well known construction. The wall of the trunnion pipe 89 has a number of large perforations 111 therein, inside the housing 108.

Communicating with and secured to the trunnion pipe 89 is a branch pipe 112, going to the burners of the furnace as will be described, and which is attached to and rocks with the furnace.

In Fig. 10 is illustrated one of the two identical or similar furnaces and as shown therein, it has a cover 14, an upper riser main 43, a branch main 47, and a box conduit 48 going to a cover duct 17 (not shown), the riser main 43 being guided by a guide 45 and having a flange 58 by which it can be raised and lowered (by a lever and cam mechanism not shown), all of which may be like that of the form of Figs. 1 to 7.

The lower riser main 116 (corresponding to the lower riser main 42 of Figs. 1 to 7), and the rotary and sliding joint 114 therefor corresponding to that at 44 of Figs. 1 to 7, instead of being stationary as in that form, rock or tilt with the furnace, and are supplied with gas from the trunnion pipe 89. The branch pipe 112 communicates at one end with the trunnion pipe 89 as aforesaid and at its other end, at the back of the furnace, enters the sliding joint structure 114 in which the lower end of the upper riser 43 slides longitudinally and rotates.

For stability, the sliding joint structure 114 is secured to a bracket 115 on the furnace outer shell 5. Extending downwardly from the outside of the sliding joint structure 114 is a post 116 which abuts upon the base frame 71 as a stop to predetermine the normal unrocked position of the furnace.

In broken line in Fig. 10 is illustrated the tilted or rocked position of the rocking parts. Links 117 connecting the cover 14 to the upper riser 43, as will be apparent, keep the cover from sliding out of position on the furnace top when the furnace is tilted. As is apparent, all of the parts including the furnace itself, the cover 14, the riser 43, the sliding joint structure 114 for the riser 43 and the branch main 112 all rotate or rock in unison with the trunnion pipe.

The construction for the left hand furnace may be the same as that just described for the right hand furnace.

The general operation of the form of Figs. 8 to 12, is the same as that described for the form of Figs. 1 to 7; the gas fuel being switched back and forth from the melting furnace to the preheating furnace; the difference being that to remove melted metal, instead of removing the cover and lifting out the crucible and replacing it with a fresh one, the cover is left in place and the furnace is tilted by turning the hand wheel 105 and the melted metal is poured out as in Fig. 12, and the furnace is restored to normal position, and a new charge put into the same crucible through the opening 22 in the cover.

The cover need be raised and rotated to the side only to give access to the interior of the furnace for inspection or to replace a part such as a deteriorated crucible.

In Figs. 13 to 15 is illustrated another form of the invention of which Figs. 13 and 14 show it in non-tilting type, and Fig. 15 in tilting type. Certain general principles of construction having been completely illustrated for the preceding forms, a simplified showing and description of this form will suffice.

In this form only one furnace, of a twin furnace construction is illustrated; the principal differences over the forms of Figs. 1 to 12 being in the interior construction of the combustion chamber, and the construction of the burners and cover. In the form of those figures, the combustion chamber liner 9 at the upper part is nearly vertical or inclined outwardly and to keep the burning fuel moving over the liner in contact with it, and to avoid excessive rise of back pressure at the top of the chamber, and to insure heating of the liner to radiating temperature, the burner tunnels 21 direct the flame laterally at an angle to the liner. In this form, the liner 118 converges inwardly, downwardly, and the burner tunnels direct the flame almost straight downwardly upon the sloping liner.

In this form there is a burner ring 119 and a cover proper 120 thereon. The burner ring 119 can be described by the preferred process of making it. An annular sheet metal duct 121 is made of rectangular radial cross section, and having a downwardly inwardly inclined outer wall 122. A ring 119 of refractory material is premolded having a radially outwardly extending flange 123 overlapping the top of the duct 121 and a depending wall 124 spaced from the inner wall of the duct. Refractory setting cement or the like 125 is tamped into the space between the depending duct wall 122 and the refractory wall 124 and trapped therein by the inclination of the duct wall 122; a circular series of burner tunnels 126 communicating, through perforations 127 in the duct, with its interior, being concurrently molded. The annular refractory ring 119 provides a large central opening 128.

The under side of this burner ring 119 is formed to be planar and to rest upon the planar top of the furnace, and may be considered as a part of the furnace proper.

The opening 128 in the ring 119 is in effect the opening at the top of the furnace proper; and is large enough to admit the crucible and the usual crucible tongs, for inserting or removing the crucible 129.

At one side of the duct 121 its interior communicates with a sheet metal box-like duct 130 extending radially therefrom and welded thereto; to the underside of which is welded, in interior communication therewith, the upper end of a riser gas main 131; stabilized by a bracket 132; and which at its lower end connects with a right hand main 133 going to a three-way two-port valve 134 (Fig. 13) the latter connected to a corresponding left hand main 135 going to the left hand furnace, and to a gas fuel source main 136.

Gas fuel is thus supplied to all of the burner tunnels 126 (the circular series of which has not been shown), and by means of the valve 134 can be switched from one furnace to the other in accordance with the twin furnace operation hereinbefore described for Fig. 1.

The cover proper 120 lies upon the top of the burner ring 119 and comprises a simple annulus of refractory material having a central opening 137 therein for charging material into the crucible.

To render the cover 120 removable, to give access to the combustion chamber and crucible, it is hinged to the furnace and counter-weighted as follows. A metal clamping-ring 138, preferably in parts secured together by bolts 139, Fig. 13, is clamped tight around the cover, and preferably seated in an annular groove 140 in the cover periphery.

At diametrically opposite points on the clamping ring it has outwardly extending pairs of parallel pins 141—141 welded thereto. Parallel arms 142 and 142 extend horizontally along the sides of the cover and have oversize perforations 143 loosely surrounding the pins 141. The arms 142 are connected together and braced by a bar 144 and diagonal braces 145, into a rigid frame. A bracket 146 having a transverse base 147 welded to the top of the duct 121, and upstanding ears 148 at its opposite ends, has aligned perforations in the ears; and a hinge pintle pin 149, is projected through the ear perforations and through corresponding perforations in the arms 142 to provide a hinge for the arms and the said rigid frame. The arms 142 extend beyond the hinge and are provided with counterweights 150 to balance the weight of the cover. The cover can thus be manually rocked upwardly on the hinge pintle 149, for example to the broken line position of Fig. 14.

The single right half furnace above described has its combustion chamber in communication with its left half mate, not shown, by means of a passageway 151, as described for the preceding forms and for a like purpose.

The tilting type of this construction, shown in Fig. 15 will be seen to be similar to that of the form of Figs. 8 to 12 and a brief description will suffice. The pair of trunnion bearings for each of the two furnaces, one pair of which are indicated at 152 and 153 in Fig. 15, are the same as in the said form of Figs. 8 to 12, the structure at the outside being broken off at 154 and therefore the hand wheel for rotating it being omitted. The vertical riser main (131 of Fig. 14) is in this instance connected to branch mains 155 and 156, the latter joined to and communicating with the interior of the trunnion pipe 89, and receiving gas fuel from a right hand supply main 157 through the rotary pipe coupling 158 from the three way valve 35.

The construction for the left hand furnace may be identical with that of Fig. 15 and will be understood.

In Figs. 16 to 19 is illustrated another form of invention.

This form is provided with unitary self-contained commercial burners of a type to which air and fluid fuel, gas or oil, are conducted, and in which a combustible mixture is made, and which discharge a flame. The twin furnaces 2 and 3 of this form are not shown in complete detail, but in view of the more complete showing of similar furnaces in the foregoing, will be understood from the following brief description. Each comprises as shown in the drawing an outer shell 159, an interior refractory wall 160 having a refractory liner 161, a bottom 162, and a stool 163 upon which the crucible 164 is supported, and a corresponding combustion chamber 165. A cover 166 rests upon the top of each furnace and has a central opening 167 for charging the crucible.

For each furnace there is shown at 168—169—170 and 171 four burners of the type above referred to, supported above the cover 166 and firing flames downwardly through burner tunnels 172—173—174—175 in the cover directly under the burners respectively, and into the combustion chamber 165. The flames are preferably directed at an angle toward and upon and over the liner 161 for the purposes set forth hereinbefore, by inclining the burner tunnels toward the liner as shown for two of them in Fig. 17.

The cover 166 is, in this instance, merely a thick disc of refractory material, surrounded by a metal clamping ring 176 in sectors as shown drawn clampingly tight by bolts 177, and seated in a peripheral groove of the cover. The cover may be molded in one piece (or several pieces) and the central opening 167 and the said burner tunnels, molded therein. The cover is planar on its under side and rests upon the top of the furnace as at 178, and closes its upwardly open chamber.

The cover 166 and the burners 168 to 171 are arranged to be raised and lowered with a hinging movement by a construction involving also the main supply of air to the four burners, a description of the construction for one of the two alike furnaces being as follows.

A U-shaped frame 179 of air pipe is provided, comprising parallel side pipes 180 and 181 and a front end pipe 182 continues therewith.

The rear ends of the side pipes are closed off and connected by a flat bar 183 welded thereto. Counterweights 184—184 have slots 185 embracing the bar and hang thereon.

Intermediate of the ends of the side pipes 180—181, are axially aligned stub pipes 186—187 joined to and communicating with the side pipes, and extending toward each other with their ends confronting but spaced apart. The stub pipes 186—187 function as trunnions, and are referred to as trunnion pipes hereafter. Each trunnion pipe 186—187 lies in a V-notch 188 in a bracket 189 secured upon the adjacent side or shell 159 of the furnace, the V-notches being trunnion bearings.

Secured to the opposite outer sides of the side pipes 180—181, by welding, are flat vertical base plates 190—190 (see Fig. 18). Bolted to the base plates 190 by bolts 191 are hanger plates 192. In the lower part of the hanger plates are holes 193—193. Pins or studs 194 of smaller diameter than the holes, are welded to the ring 176 and extend outwardly loosely through the holes.

The entire U-shaped pipe frame 180 to 183 may be manually rocked or hinged on the described trunnion bearings; and in moving will first take up the clearance of the studs 194 in the holes 193 and then will lift the cover upwardly and rearwardly to give access to the furnace interior, the looseness in said holes insuring that the cover can align itself with and seat solidly and sealedly on the top of the furnace as referred to.

The trunnion pipes 186—187 project into a housing 195 which may be variously constructed. That shown comprises a tubular metal body 196 having end flanges 197—197, spaced from which are annular heads 198 whose central openings surround the trunnion pipes 186—187 with clearance to compensate for misalignment. Spacers 199—199 are provided between the heads 197 and 198. Between the flanges 197 and spacers 199 are seals 200 in the form of washers or annular gaskets, the central holes of which sealedly grip the stub pipes. The heads 147, spacers 199, sealing gaskets 200, and flanges 198 at each end of the housing are all clamped together by bolts 201.

The interior of the housing bodies 186—196 communicate at their under sides with riser pipes 202—203 welded thereto, terminating downwardly in elbows 204—205 which go to a three-way two-port valve 206, to which is connected an air supply pipe 207 coming from an air blower not shown.

By this construction as will be seen, air under pressure in the supply pipe 207 may be switched by the valve 206 to one or the other of the riser pipes 202—203 and thence to the corresponding housing 195 and thence through both of the trunnion pipes 186—187 and to both of the side pipes 180—181, and maintain a supply of air pressure in the side pipes, equalized by the connecting end pipe 182; and that this air conduit line will not have to be interrupted upon rocking the side pipes to raise and lower the cover 166 as described.

The burners 168, 169, 170, and 171 referred to (four for each furnace) are mounted in pairs on the respective side pipes 180—181, and are raised and lowered bodily and in unison therewith and with the cover, when the latter is raised and lowered. These burners may be of any suitable or conventional or commercial construction. They comprise means to atomize oil and mix it with air, but are adapted, optionally, to mix gas, instead of oil, with the air. In either case, the burning fuel is projected downwardly therefrom by the air pressure, in a flame. The particular construction shown is as follows for oil fuel.

Each burner comprises a housing 208, out of the lower end of which the flame is projected, and within which are the oil atomizing and oil and air mixing parts of the burner. The housing is connected to and supported by a bracket 209 welded to the side pipe. A main air conduit 210 communicates with the air supply side pipe.

An oil supply inlet 211 communicating with the burner housing, conducts oil into the housing.

An air supply inlet 212 communicates with the burner housing, and supplies oil-atomizing air to it.

Under the oil atomizing air inlet as viewed in Fig. 17, is an inlet 213 which is plugged when oil is used, and it may be selectively utilized to supply gas fuel to the housing, in which case the oil inlet is not used and is plugged.

As aforesaid the large volume supply of air to make a combustible fuel mixture comes from the side pipes 180 and 181 to the burner housing, through the conduits 210.

The pipes to the oil inlets 211 and atomizing air inlets 212 are not shown in Fig. 16, for clearness, but are shown and connected to their supply sources in Fig. 19 wherein also the furnaces are indicated in broken line.

In Fig. 19, the oil inlets 211 of the four burners of one furnace are all connected to an oil manifold 214 which connects through a flexible hose 215 to one side of a three-way two-port oil valve 216. A like oil manifold 217 connected to the oil inlets of the other furnace, is connected through a similar flexible hose 218 to the other side of the valve 216; the valve being connected to an oil supply pipe 219 connected to a source of oil under pressure not shown.

Similarly, the atomizing air inlets 212 of the burners are connected to air manifolds 220 and 221, and thence through flexible hoses 222 and 223 to opposite sides of a two way valve 224 to which is connected, by a pipe 225, a supply of blast or atomizing air under pressure.

The flexible hoses 215—218 and 222—223 may lie approximately along the hinging axis indicated at 226 if desired, so as not to be subjected to excessive strain when the cover is hingingly raised and lowered.

Upon switching the main air supply from one furnace to the other by the three-way two-port valve 206 for the purposes hereinbefore described, the oil supply may also be switched by the valves 216 and 224. The atomizing air supply can also be switched by a three-way two-port valve in place of the two-way valve 224, but I prefer to utilize a two-way valve at 224 and adjust it for an optimum rate of flow and leave it so adjusted; and when the oil and main air supplies are switched to one furnace, the atomizing air continues to flow through the burners of the other furnace (without combustion thereat) and serves to cool them during the idle period of these burners.

When gas is used instead of oil (and the oil inlets 211 are closed off and the oil supply and manifolds etc. are omitted), the atomizing air system above described may be considered as the gas fuel system without further illustration or description, in which case the valve 224 would be a three-way two-port valve to switch the gas supply.

The burners have been omitted from the right hand furnace in Fig. 16 for simplification, but their positions are identified as part of the structure by the showing of the burner supporting brackets 209 and by the tunnels 172 to 175 directly under them.

The passageway connecting the combustion chamber 165 of one furnace with that of the other in connection with switching the fuel supply from one to the other for the described purposes, is shown in Fig. 17 at 227 and indicated by its surrounding and enclosing structure at 228 in Fig. 16.

In other respects the operation of this oil burning or gas burning twin furnace will be the same as that of the furnaces previously described.

In Figs. 20 to 22 is shown another form of the invention, which again has commercial burners which may be used with either gas or oil.

Each of the duplicate furnaces as shown for one of them in Fig. 21 has, as hereinbefore described, an outer steel shell 229, the main refractory wall 230, the chamber floor 231, stool 232, crucible 233 and combustion chamber 234. The chamber liner is not shown but may be provided if desired as in preceding forms.

A cover 235 having a central opening 236 rests upon and closes the upwardly open furnace, and in this form is a simple disc (of one or more parts) having a clamping ring 237 clamped around its periphery; and rings 238—238 welded to its diametrically opposite sides by which it may be raised and lowered by any suitable hoisting means not shown.

As shown in Fig. 20 and indicated in Fig. 21, the two combustion chambers of the twin furnaces are interconnected by a passageway 239 as in preceding forms for the purposes described.

In all of the preceding forms of the invention the fuel flame is fired downwardly into the open top of the combustion chamber; and the flame is directed against the side wall of the combustion chamber whether straight downwardly thereover, or downwardly thereover at an angle, that is spirally or helically. The advantages of firing the combustion chamber in this manner have been explained.

In the form of Figs. 20 and 21, the downward spiral firing is retained; but the flame is introduced to the combustion chamber at a point below the top. Each furnace is fired by three burners 240—240—240 through three corresponding burner tunnels 241—241—241 which, as shown in Fig. 20 direct the flame into the combustion chamber 234 substantially tangential to its wall and, as shown for one of them in Fig. 21, in a downward direction at an angle; the burner tunnels 241 opening into the combustion chamber as at 242, Fig. 21, at about half way down, and opposite the lower portion of the crucible.

To support the burner, a sheet metal box-like support 243 is mounted on the side of the furnace by welding it to the outer shell 229 of the furnace, the box-like support, to this end, being open at the side toward the furnace shell. The box-like support is filled with refractory material 244 having the outer part 245 of the burner tunnel 241 molded therein.

The inner end portion 246 of the burner tunnel is molded in the outer refractory wall 230 of the furnace, and axially aligned with the outer part 245. A hole 247 is provided in the shell, as a part of the tunnel.

The box-like support 243 is formed to provide an outer supporting base 248 at right angles to the axis of the burner tunnel 241 upon which the burner proper, 240, is mounted; this particular provision resulting from the utilization of a burner that discharges flame at right angles to its own base. The outer supporting base 248 may have a different disposition to correspond with other types of burner that may be used.

The six burners 240 are shown in elevation only. They are, as stated of a commercial type. Each has an inlet 249 for an oil pipe; an inlet 250 for an oil atomizing air blast pipe; and an inlet 251 for a main air supply pipe for combustion air.

The pipes to the several said inlets are omitted from Figs. 20 and 21 for simplification, but are shown in Fig. 22 in somewhat diagrammatic form. The burners shown diagrammatically at 240 in Fig. 22 are in the same positions as in Fig. 21, for the right hand and left hand furnaces, indicated at 2 and 3 in Fig. 22, to identify them. The main air supply inlets 251, of the burners of furnace 2, connect with a manifold pipe 252 going to one side of a three-way two-port valve 253; and the corresponding inlets of the burners of furnace 3, all connect to a manifold 254 going to the other side of the three-way two-port valve 253, the latter being connected by a pipe 255 to a source of main combustion air under pressure, not shown.

Similarly manifolds 256 and 257 are connected to the air blast inlets 250 of the burners of the furnaces 2 and 3 respectively, and go to a three-way two-port valve 258 connected by a pipe 259 to a blast air pressure source not shown.

Similarly also manifolds 260 and 261 are connected to the oil inlets 249 of the burners of the furnaces 2 and 3 respectively, and to a three-way two-port oil valve 262 connected by a pipe 263 to a source of oil under pressure not shown.

To switch the fuel from the burners of one furnace to those of the other in the hereinbefore contemplated mode of operation of the two duplicate furnaces, the three three-way two-port valves 253, 258, and 262 are turned in corresponding directions as will be understood.

If desired however the valve 258 may be a two-way valve set at a fixed optimum flow rate adjustment and when the oil and main air supplies are switched to one furnace, the air blast may continue to flow to the burners of the other furnace for cooling purposes.

Otherwise the operation is the same as that of the preceding forms.

On each of the burners is a plugged pipe inlet at 264.

When the burners are used to burn gas instead of oil, the gas supply is connected to the inlet 264 and the oil pipe inlet 249 is plugged; and a piping arrangement like that of Fig. 22 is used, but in such case the supply pipe 259 would go to a supply of gas under pressure, and the manifolds 256 and 257 would go to the said gas inlets 264 of the burners as referred to, and the oil system including the supply pipe 263 and the manifolds 260—261 would not be used. With the pipe system showing of Fig. 22 for oil it is believed unnecessary to illustrate a complete piping system for gas, in view of the above description, and the foregoing description of the manner in which the burners are changed over from oil to gas.

The slag discharge outlet 13 illustrated in connection with the form of the invention of Figs. 1 to 7 may be applied to the other forms as will be understood without complicating this specification.

Burners projecting the flame into the combustion chamber in a downward and lateral direction producing a downwardly directed spiral flame, are shown for the forms of Figs. 1 to 12 and for the form of Figs. 20 to 22. It is believed that it will be clear how this feature may be applied to the form of Figs. 13 to 15 and to the form of Figs. 16 to 19 without further illustration or description, by simply giving a suitable angular inclination to the burner tunnels 21 and 172 etc. of these two forms respectively.

While the furnaces are illustrated and described herein as twin furnaces, the fuel being switched from one to the other, in the preferred mode of operation, it will be apparent that some of the advantages and improvements of the invention are in each furnace, considered singly. The invention therefore comprehends the embodiment of these improvements in a single furnace and in its operation as such. In such case the outlet from the lower part of the furnace (which leads to the interconnecting passageway for twin furnace operation), becomes the burnt gas outlet from the single furnace. The showing herein therefore is complete without further complication as showing those skilled in the art how to make and operate single furances embodying the invention.

The embodiments of the invention illustrated and described may be variously changed and modified by those skilled in this art and the invention is comprehensive of all such changes and modifications which come within the scope of the appended claims.

I claim:

1. A furnace for heating crucibles and the like comprising two upwardly open refractory walled combustion chambers, each having a removable cover and an opening to atmosphere through the cover; a support in each chamber for supporting a crucible under the cover opening; a refractory walled passageway communicating between the chambers at lower portions thereof; the cover of each chamber having a plurality of burner tunnels therein open at the top and opening downwardly at the lower side of the cover; an air conduit connected to the cover; a plurality of burners supported by the air conduit and comprising means for mixing fluid fuel and air, and disposed to project flames of burning fuel downwardly into and through the tunnels; the tunnels disposed to direct the flames downwardly into the top of the chamber and around its contained crucible; fluid fuel conduit means and air conduit means for supplying fluid fuel to the burners and air to the air conduits respectively; conduits from the air conduit to the burners; valve means controlling the conduit means to switch the fuel and air supply to the burners of the respective furnaces singly and successively.

2. A furnace for heating crucibles and the like comprising two upwardly open refractory walled combustion chambers, each having a removable cover and an opening to atmosphere through the cover; a support in each chamber for supporting a crucible under the cover opening; a refractory walled passageway communicating between the chambers at lower portions thereof; a stationary refractory ring at the top of the chamber having a large central opening and provided with a manifold and a plurality of burner tunnels communicating therewith and opening at the bottom of the ring; fluid fuel and air conduit means for supplying a pressure induced flow of fuel into the manifold and out at the tunnels; the tunnels disposed to project the fuel, when burning, downwardly into the top of the chamber and around its contained crucible; valve means controlling the conduit means and operable to switch the fuel and air supply to the manifold of the respective furnaces singly and successively; the cover normally resting upon the ring and covering the ring central opening; the cover provided with a hinge at one side upon which it may be rocked to uncover the central opening of the ring; and a weight counterbalancing weight of the hinging cover; a hinge support for the air conduit upon which it and its supported burners and connected cover may be rocked to uncover the chamber; the air conduit means and fluid fuel conduit means, comprising stationary parts and parts movable with the air conduit and connections joining the stationary and movable parts maintaining the fluid fuel conduit means and air conduit means uninterrupted during rocking of the air conduit.

3. A furnace for heating crucibles and the like comprising an upwardly open refractory walled combustion chamber having a removable cover, and an opening to atmosphere through the cover; a support in the chamber for supporting a crucible under the cover opening; the cover having a plurality of burner tunnels therein, open at the top and opening downwardly at the lower side of the cover; an air conduit connected to the cover; a plurality of burners supported by the air conduit and comprising means for mixing fluid fuel and air, and disposed to project flames of burning fuel downwardly into and through the tunnels; the tunnels disposed to direct the flames downwardly into the top of the chamber and around its contained crucible; fluid fuel supply conduit means and air supply conduit means for supplying fluid fuel to the burners and air to the air conduit; and conduits from the air conduit to the burners; and an opening for egress of burnt fuel near the chamber bottom.

4. A furnace for heating crucibles and the like comprising an upwardly open refractory walled combustion chamber having a removable cover, and an opening to atmosphere through the cover; a support in the chamber for supporting a crucible under the cover opening; the cover having a plurality of burner tunnels therein, open at the top and opening downwardly at the lower side of the cover; an air conduit connected to the cover; a plurality of burners supported by the air conduit and comprising means for mixing fluid fuel and air, and disposed to project flames of burning fuel downwardly into and through the tunnels; the tunnels disposed to direct the flames downwardly into the top of the chamber and around its contained crucible; fluid fuel supply conduit means and air supply conduit means for supplying fluid fuel to the burners and air to the air conduit; and conduits from the air conduit to the burners; and an opening for egress of burnt fuel near the chamber bottom; the air conduit provided with a hinge at one side of the cover upon which it and its supported burners and connected cover may be rocked to uncover the chamber; and the fluid fuel supply conduit means and air supply conduit means comprising stationary parts and parts movable with the cover; and means joining the stationary and movable parts maintaining the conduit means uninterrupted during said rocking.

GEORGE E. MARKLEY.

References Cited in the file of this patent

UNITED STATES PATENTS

| Number | Name | Date |
|---|---|---|
| 865,789 | Martin | Sept. 10, 1907 |
| 1,182,893 | Carroll | May 16, 1916 |
| 1,241,397 | Keith | Sept. 25, 1917 |
| 1,485,151 | Roessel et al. | Feb. 26, 1924 |
| 2,215,079 | Hess | Sept. 17, 1940 |
| 2,540,806 | Berger, Jr. | Feb. 6, 1951 |

FOREIGN PATENTS

| Number | Country | Date |
|---|---|---|
| 454,802 | France | May 6, 1913 |
| 594,640 | France | June 27, 1925 |
| 173,603 | Great Britain | Jan. 4, 1922 |